US012158476B2

United States Patent
Ju et al.

(10) Patent No.: US 12,158,476 B2
(45) Date of Patent: Dec. 3, 2024

(54) AUTOMATIC ANALYSIS APPARATUS AND OPERATING METHOD THEREFOR

(71) Applicant: SHENZHEN MINDRAY BIO-MEDICAL ELECTRONICS CO., LTD., Shenzhen (CN)

(72) Inventors: Wentao Ju, Shenzhen (CN); Ersheng Li, Shenzhen (CN); Yanwen Weng, Shenzhen (CN); Jun Wang, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 264 days.

(21) Appl. No.: 16/825,947

(22) Filed: Mar. 20, 2020

(65) Prior Publication Data
US 2020/0217865 A1 Jul. 9, 2020

Related U.S. Application Data

(63) Continuation of application No. PCT/CN2017/102535, filed on Sep. 20, 2017.

(51) Int. Cl.
G01N 35/02 (2006.01)
G01N 35/04 (2006.01)

(52) U.S. Cl.
CPC ... G01N 35/025 (2013.01); *G01N 2035/0443* (2013.01)

(58) Field of Classification Search
CPC ............ G01N 35/025; G01N 35/0098; G01N 35/009; G01N 2035/0094;

(Continued)

(56) References Cited

U.S. PATENT DOCUMENTS 7,842,237 B1 * 11/2010 Shibuya ............... G01N 35/026 422/65
2012/0020838 A1 * 1/2012 Mimura ............... G01N 35/025 422/68.1

(Continued)

FOREIGN PATENT DOCUMENTS

CN 1963527 A 5/2007
CN 200989905 Y 12/2007

(Continued)

OTHER PUBLICATIONS

International Search Report issued in corresponding International Application No. PCT/CN2017/102535, mailed Jun. 25, 2018, 5 pages.

*Primary Examiner* — Elizabeth A Robinson
*Assistant Examiner* — Austin Q Le
(74) *Attorney, Agent, or Firm* — Kory D. Christensen

(57) ABSTRACT

An automatic analysis apparatus and an operating method therefor. A temporary storage portion is introduced, a multi-component test project may be divided into new one-step test processes, or a multi-step test process may be divided into new one-step test processes, and test sequences and processes may be re-entered, so that each mechanism, unit and control time sequence may be designed according to one-step test processes in a standard and orderly manner, so as to solve the problem that multi-component test projects and multi-step test processes disturb normal processes, thereby effectively increasing the test speed and the test throughput of the whole machine.

23 Claims, 6 Drawing Sheets

(58) Field of Classification Search
CPC ... G01N 2035/0095; G01N 2035/0441; G01N 2035/0443; G01N 2035/0444
See application file for complete search history.

(56) References Cited

U.S. PATENT DOCUMENTS

| | | | | |
|---|---|---|---|---|
| 2013/0034466 A1* | 2/2013 | Wakamiya | ......... | G01N 35/0092 422/63 |
| 2016/0033487 A1* | 2/2016 | Zhang | ............. | G01N 35/00871 435/287.2 |

FOREIGN PATENT DOCUMENTS

| | | | | |
|---|---|---|---|---|
| CN | 101419240 A | | 4/2009 | |
| CN | 102906572 A | | 1/2013 | |
| CN | 102914662 A | | 2/2013 | |
| CN | 102998473 A | | 3/2013 | |
| CN | 104111343 A | | 10/2014 | |
| CN | 104345158 A | | 2/2015 | |
| CN | 106199026 A | | 12/2016 | |
| CN | 206450697 U | | 8/2017 | |
| JP | 2010032386 A | * | 2/2010 | |
| JP | 2010145284 A | | 7/2010 | |
| WO | WO-2017141627 A1 | * | 8/2017 | ............. G01N 35/10 |

\* cited by examiner

AUTOMATIC ANALYSIS APPARATUS AND OPERATING METHOD THEREFOR

CROSS-REFERENCE TO RELATED APPLICATIONS

This application is a bypass continuation of Patent Cooperation Treaty Application No. PCT/CN2017/102535, filed on Sep. 20, 2017, the content thereof is hereby incorporated by reference in its entirety.

TECHNICAL FIELD

The present disclosure relates to an automatic analysis apparatus and an operating method therefor.

BACKGROUND

Automatic analysis apparatuses, taking an immunoassay analyzer as an example, are a type of highly sensitive and highly specific analysis instruments, and are often used in clinical laboratories to detect various analysis indexes of blood, urine or other body fluids. Traditional immunoassay analyzers have multiple implementation principles, such as chemiluminescence and electrochemical luminescence. Taking a heterogeneous chemiluminescence immunoassay analyzer as an example, referring to FIG. 1, the main operating principle is as follows: when it is necessary to measure a certain component in a sample, a magnetic bead reagent can be formed by coating magnetic beads with a corresponding antibody/antigen, and a labeling reagent can be formed by labeling the antibody with a specific label (a reagent for measuring an analysis project generally comprises multiple components, such as the magnetic bead reagent component and the labeled reagent component here, and different components for the same project can be packaged in different reagent containers or in different chambers of the same reagent container). In a test process, firstly, a sample containing a component to be measured is successively mixed with a magnetic bead reagent, a labeling reagent and other reagents to form a sample-reagent reaction solution (referred to as a reaction solution), and the sample-reagent reaction solution is subjected to incubation and reaction under certain conditions to form a reaction complex; the unbound labels, other reagents and sample components in the reaction system are then removed by means of bound-free (B/F) technology; and a signal reagent is then added thereto such that the labels on the reaction complex reacts with the signal reagent (or catalyzes the signal reagent) to emit light; there may be one or more signal reagents, such as a luminescent substrate solution, a pre-excitation solution, an excitation solution and a luminous enhancement fluid. There are many specific coating and cleaning methods including, in addition to the magnetic bead cleaning method described above, coating a wall of a reaction container with an antibody, using plastic beads, etc.

The existing immunoassay analyzers generally have low test throughput, which cannot meet the increasing size of test in this field so as to seriously affect the operating efficiency of doctors and other users who need to diagnose based on the sample measurement results.

SUMMARY

The present disclosure mainly provides an automatic analysis apparatus and an operating method therefor.

According to a first aspect, an automatic analysis apparatus is provided in one embodiment, which includes:
a reaction cup loading mechanism configured to supply and carry a reaction cup to a cup assignment station;
a sample unit configured to hold a sample;
a sample dispensing mechanism configured to aspirate the sample and discharge the sample into a reaction cup at a sample addition station;
a reagent unit configured to hold a reagent;
a reagent dispensing mechanism configured to aspirate the reagent and discharge the reagent into a reaction cup at a reagent addition station;
a reaction plate, which is configured to be of a circular plate structure, which has a plurality of placement stations for placement of reaction cups, and which is capable of rotating and driving a rotation of the reaction cups in the placement stations so as to schedule the reaction cups in the reaction plate and incubate a reaction solution in the reaction cup;
a mixing mechanism configured to mix the reaction solution to be mixed in the reaction cup;
a measurement unit configured to measure the reaction solution to be measured;
a magnetic separation unit configured to perform magnetic separation cleaning on the reaction solution in the reaction cup;
a transfer mechanism configured to at least schedule a reaction cup among the reaction cup loading mechanism, the reaction plate, the mixing mechanism and the magnetic separation unit;
a control unit configured to at least control operations and a time sequence of the sample dispensing mechanism, the reagent unit, the reagent dispensing mechanism, the reaction plate, the mixing mechanism, the measurement unit, the magnetic separation unit and the transfer mechanism; and
a temporary storage portion, which is arranged independent from the reaction plate and is configured to receive and temporarily store the reaction cup that is scheduled from the reaction plate by the transfer mechanism so as to wait to be scheduled back to the reaction plate again.

According to a second aspect, an operating method for an automatic analysis apparatus is provided in one embodiment, the operating method includes:
firstly scheduling a reaction cup to a sample addition station to perform sample addition;
scheduling the reaction cup after sample addition to a reagent addition station in a reaction plate to perform reagent addition;
scheduling the reaction cup after reagent addition to a mixing mechanism;
scheduling the reaction cup from the mixing mechanism to a position for incubation in the reaction plate to perform incubation;
scheduling the reaction cup after incubation to a magnetic separation mechanism to perform magnetic separation cleaning; and
scheduling the reaction cup after magnetic separation cleaning back to the reaction plate by which the reaction cup is scheduled in the reaction plate to an optical measurement station to perform optical measurement;
the reaction cup is added with a preset number of types of reagents at most at the reagent addition station in the reaction plate each time; when a number of types of reagents to be added to the reaction cup at the reagent addition station in this incubation is greater than the preset number, the reaction cup is added with the preset number of types of reagents; after this and before the reaction cup is added with other reagents needed for this incubation, the reaction cup is firstly scheduled to a temporary storage area independent from the reaction plate to perform temporary storage; the reaction cup is then scheduled from the temporary storage area back to the reaction plate to continue adding other reagents needed for this incubation; and/or, when a test project for any reaction cup is a multi-step test project, in any step of test other than a last step of test, when the reaction cup needs to be performed magnetic separation cleaning in this step of test, the reaction cup after incubation in the reaction plate is firstly scheduled to the magnetic separation unit to perform magnetic separation cleaning, and then the reaction cup after magnetic separation cleaning is scheduled from the magnetic separation unit to the temporary storage area independent from the reaction plate to perform temporary storage; when the reaction cup in this step of test does not need to be performed magnetic separation cleaning, the reaction cup after incubation in the reaction plate is scheduled from the reaction plate to the temporary storage area independent from the reaction plate to perform temporary storage; and the reaction cup temporarily stored in the temporary storage area is then scheduled back to the reaction plate to perform other subsequent steps of test.

According to a third aspect, an automatic analysis apparatus is provided in one embodiment, which includes:

a dispensing mechanism configured to aspirate and discharge a solution;

a reaction plate, which is configured to be of a circular plate structure, which has a plurality of placement stations for placement of reaction cups, and which is capable of rotating and driving a rotation of the reaction cups in the placement stations so as to schedule the reaction cups in the reaction plate and incubate a reaction solution in the reaction cup;

a transfer mechanism configured to schedule the reaction cup into or out of the reaction plate;

two cleaning solution placement stations, one of which is configured to hold a container filled with a concentrated cleaning solution, and another of which is configured to hold a container filled with a diluent that is configured to dilute the concentrated cleaning solution, the two cleaning solution placement stations being arranged on a trajectory of motion of the dispensing mechanism; and a control unit configured to control the dispensing mechanism to respectively aspirate a solution in each of the containers at the two cleaning solution placement stations and discharge the solutions into the reaction cup to prepare a diluted cleaning solution.

In accordance with an automatic analysis apparatus and an operating method therefor of the embodiments described above, since a temporary storage portion is introduced, a multi-component test process can be divided into a new one-step test process, or a multi-step test process can be divided into several new one-step test processes and re-enter the test sequence and process, so that the mechanisms and units and the control sequence can be designed according to a one-step test process, which is in a very standard and orderly manner, so as to solve the problem that multi-component test projects and multi-step test processes disturb normal processes, thereby effectively increasing the test speed and test throughput of the whole machine.

DETAILED DESCRIPTION OF EMBODIMENTS

Figure 1:
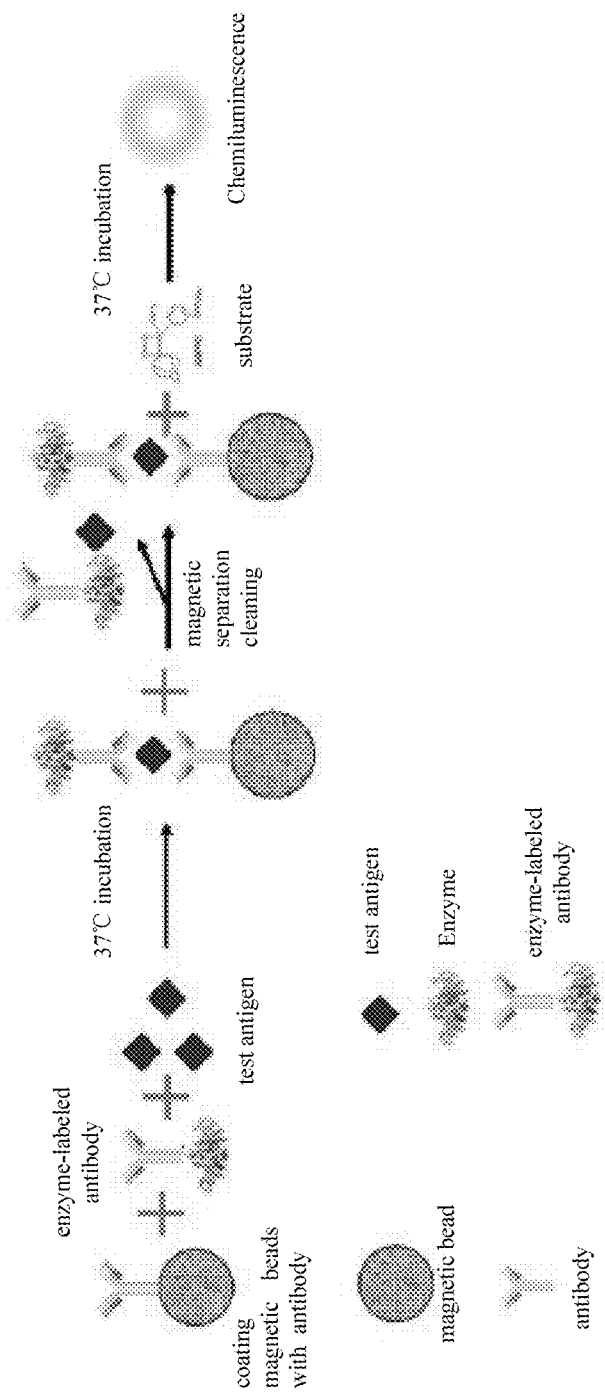
FIG. 1 is a test principle diagram of immunoassay.

The present disclosure will be further described in detail below through specific embodiments in conjunction with the accompanying drawings. Associated similar element reference numerals are used for similar elements in various embodiments. In the following embodiments, many details are described so that the present disclosure can be better understood. However, it would be effortlessly appreciated by those skilled in the art that some of the features can be omitted or may be substituted by other elements, materials and methods in each cases. In certain cases, some operations involved in the present disclosure are not displayed or described in the specification, which is to prevent the core part of the present disclosure from being obscured by too much description. Moreover, for those skilled in the art, the detailed description of the involved operations is not necessary, and the involved operations can be thoroughly understood according to the description in the specification and the general technical knowledge in the art.

In addition, the characteristics, operations or features described in the specification can be combined in any appropriate manner to form various embodiments. Moreover, the steps or actions in the method description can also be exchanged or adjusted in order in a way that would have been obvious to those skilled in the art. Therefore, the various orders in the specification and drawings are merely for the purpose of clear description of a certain embodiment and are not meant to be a necessary order unless otherwise stated that a certain order must be followed.

The serial numbers themselves for the components herein, for example, "first", "second", etc., are merely used to distinguish the described objects, and do not have any sequential or technical meaning. Moreover, as used in the present disclosure, "connection" or "coupling", unless otherwise specified, includes both direct and indirect connections (couplings).

In the present disclosure, a one-step test project means that one test project only needs one step of incubation. Accordingly, a multi-step test project means that one test project needs multiple steps of incubation. For example, a two-step test project means that the test project needs two steps of incubation, in which reagents needed for a first step of incubation are firstly added to the sample, and the first step of incubation is then performed; after the time of the first step of incubation has elapsed, reagents needed for the second step of incubation are added, and then the second step of incubation is performed; and after the time of the second step of incubation has elapsed, magnetic separation is performed, and the measurement is then performed. In general, in a multi-step test project, magnetic separation is needed after the last step of incubation, and then the measurement can be performed; but in a multi-step test project, except for the last step, after the other steps of incubation, whether magnetic separation is needed or not depends on the factors such as the type of test project. For example, in a two-step test project, if magnetic separation is needed after incubation in the first step of test, the two-step test project can be referred to as a two-step two-separation test project, and if no magnetic separation is needed after incubation in the first step of test, the two-step test project can be referred to as a two-step one-separation test project.

In a one-step test project or a multi-step test project, for each step of incubation or for each incubation, one or more types of reagents needed to be added are provided, which is determined according to the factors such as the type of test project; and in a one-step test project or a multi-step test project, if multiple types of reagents is needed to be added for incubation in one or more steps of test, such test project can be referred to as a multi-component test project.

It has been found that in various test projects, magnetic separation cleaning is a necessary process and link. Since magnetic separation cleaning needs a long immobilization time, magnetic separation cleaning is also a time-consuming link, especially for some multi-step test projects that need magnetic separation cleaning for multiple times. In addition, since the cycles of other units or components in the device need to be consistent with the links of magnetic separation cleaning mentioned above, the test speed and test throughput of the apparatus are limited.

It has also been found that during operation of the immunoassay analyzer, the multi-step test project and the multi-component test project are the main reasons that affect the test throughput. Taking a multi-component test project as an example, since the time needed for each aspiration and discharge action of a reagent pin cannot be infinitely compressed, and based on the characteristics of an immune response, the reagent pin needs to perform aspiration and discharge for multiple times in the same cycle to perform dispensing of multiple reagent components in one step of test in one test. In order to avoid cross contamination carried by the reagent pin through an outer wall thereof when different reagent components are aspirated, it is necessary to clean the outer wall of the reagent pin between the steps of aspirating different components, so that the dispensing of multiple reagent components in one step of test is one of the longest time-consuming links in the analysis apparatus, which affects the test throughput. In addition, the immunoassay analyzer sometimes needs to perform test processes such as sample pre-dilution and pre-treatment. Such "non-standard" test processes are also one reason that affects the test throughput.

After the above problems have been found, in order to increase the test speed and test throughput, it has been found that the effect of increasing the test speed and test throughput can be achieved by solving any of the problems in the separation time of magnetic separation cleaning, the dispensing time of a multi-component reagent in a multi-component test project, the simplification for the process of magnetic separation for multiple times, the simplification for the process of a multi-step test project, etc.

Before the present disclosure is proposed, some current technical solutions are firstly viewed herein.

In the U.S. Pat. No. 6,825,041, both a reagent addition station and a sample addition station are arranged outside a reaction plate, and four reagent pins are introduced for operation. Each of the reagent pins has a cycle of 36 seconds, any of the reagent pins is in one cycle thereof, and all reagents will be added to a reaction cup/reaction vessel under the reagent pin, regardless of whether the reaction cup needs to be added with one reagent or multiple reagents at this time. After one operating cycle, the reaction cup under the reagent pin will be re-scheduled back to the reaction plate. Since four reagent pins are introduced to operate in parallel, the reaction plate has an operating cycle of 9 seconds. It can be seen that it will take one cycle, i.e., 36 seconds, of the reagent pin, regardless of whether the reaction cup needs to be added with one reagent or multiple reagents once, and as a result, even if four parallel reagent pins are introduced, the reaction plate has an operating cycle of only 9 seconds, and the efficiency of the whole machine is relatively low.

In the U.S. Pat. No. 5,795,784, two reagent pins are introduced, a reaction plate is provided with two reagent addition stations, and each reagent pin is responsible for one reagent addition station, wherein each of the reagent pins and its reagent addition station are used to add all the reagents needed in the first step of test process at one time, and the other reagent pin and its responsible reagent addition station are used to add all the reagents needed in the second step of test process at one time. According to this solution, for a one-step test project, the reagent pin and reagent addition station responsible for the second step of test process do not play a role and are left unoccupied during the test, which does not facilitate increasing the operation speed of the whole machine.

In the U.S. Pat. No. 5,827,478, a reaction plate is provided with a plurality of reagent addition stations, and a plurality of reagent pins in a three-dimensional motion are then accordingly arranged, so that the dispensing of multiple reagents is completed by means of successively scheduling a reaction cup to the reagent addition stations by a reaction plate, which increases the number of scheduling actions of the reaction plate, so that on the one hand the reliability of transport of the reaction plate is reduced, and on the other hand, the cycle of action of the reaction plate is extended, which is one of the reasons for restricting the speed of the apparatus. In this solution, multiple reagent dispensing units are used, which increases the costs. In this solution, a solution in which multiple reagent dispensing units are arranged outside the reaction plate is used, which increases the size of the whole machine, and more reagent addition hole stations are provided above the reaction plate, which affects the temperature control performance of the reaction plate.

In an analysis apparatus in the related art, two reaction plates and two reagent plates are provided, wherein one of the reaction plates and one of the reagent plates are responsible for a first step of test process, and the other reaction plate and the other reagent plate are responsible for a second step of test process, which significantly increases the hardware cost and volume of the whole machine. In addition, each of the reaction plates is provided with multiple reagent addition stations and a reagent pin to shorten the operating cycle of reagent addition. However, on the one hand, scheduling actions of the reaction plate will be added so as to extend the operating cycle of the reaction plate, which is the reason for restricting the speed of the apparatus, and on the other hand, the use of multiple reagent pins will increase the cost and increase the size of the whole machine.

In an analysis apparatus in the related art, a reaction plate is provided with one reagent addition station and is equipped with one reagent pin, wherein each time after a reaction cup is scheduled to a reagent addition station by the reaction plate, all the reagents needed are added at one time, which will cause the reaction plate to wait for a very long time, such as 21 seconds (equivalent to the operating cycle of the reaction plate being 21 seconds), each time after the reaction plate stops rotation at the reagent addition station, and accordingly, other units and mechanisms are also in a waiting state because they are waiting for the reaction plate, so that the efficiency is very low.

An automatic analysis apparatus with a temporary storage portion independent from reaction plate is introduced, so that a multi-component test project can be divided into several processes similar to the one-step test process, and a multi-step test process can be divided into several new one-step test processes and re-enter the test sequence and process, so that the mechanisms and units and the control sequence can be designed according to a one-step test process, which is in a very standard and orderly manner, so as to solve the problem that multi-component test projects and multi-step test processes disturb normal processes, thereby effectively increasing the test speed and test throughput of the whole machine.

Figure 2:
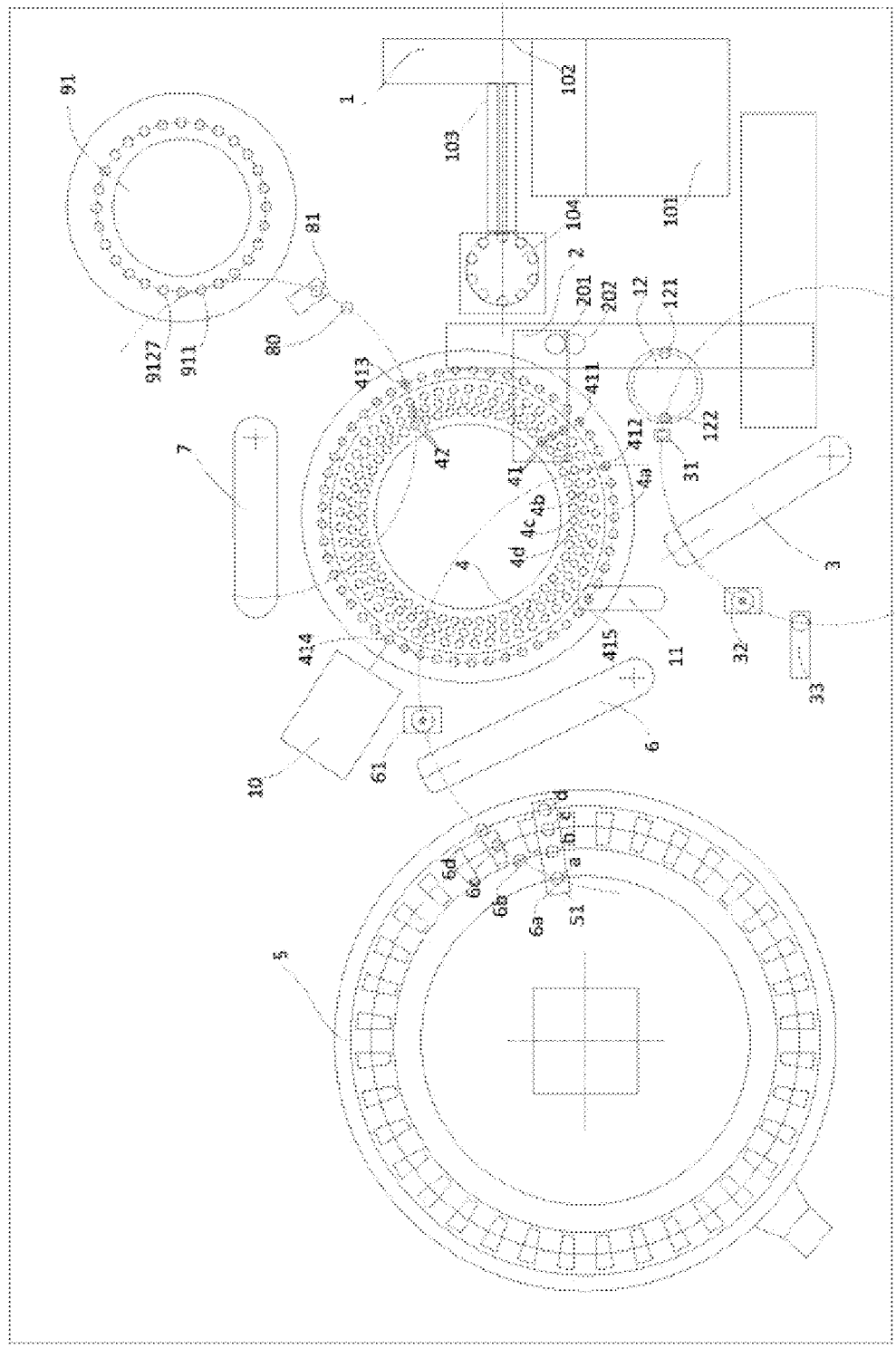
FIG. 2 is a structural schematic diagram of an automatic analysis apparatus of one embodiment.

Referring to FIG. 2, an automatic analysis apparatus is disclosed in one embodiment, comprising/including a reaction cup loading mechanism 1, a sample unit 33, a sample dispensing mechanism 3, a reagent unit 5, a reagent dispensing mechanism 6, a reaction plate 4, a mixing mechanism 81, a measurement unit 10, a magnetic separation unit 91, a transfer mechanism and a control unit (not depicted in the figure).

The reaction cup loading mechanism 1 is used to supply and carry a reaction cup/reaction vessel to a cup assignment station. In one embodiment, the cup assignment station is used to schedule, by the transfer mechanism, the reaction cup to a sample addition station. In one embodiment, the reaction cup loading mechanism comprises/includes a feed compartment 101, a pick-and-place/pickup mechanism 102, a reversing mechanism 103 and a transport mechanism 104. The feed compartment 101 is used to store the reaction cup. The pick-and-place mechanism 102 is used to pick and place, deliver and unload the reaction cup. The reversing mechanism 103 is engaged behind the pick-and-place mechanism 102, and the reversing mechanism 103 has a delivery/conveying trough that is arranged obliquely downward from one side of the pick-and-place mechanism 102, the delivery trough is sized such that a lower portion of the reaction cup can extend into the delivery trough, the delivery trough has a width less than the width of a hanging portion of the reaction cup, and the delivery trough is at least provided, at one end thereof close to the pick-and-place mechanism 102, with a first trough bottom wall, with the distance from the first trough bottom wall to an upper edge of the delivery trough being less than the distance from a lowermost portion to the hanging portion of the reaction cup. The transport mechanism 104 is engaged at a reaction cup exit of the above delivery trough, and the transport mechanism 104 has at least one reaction cup station for storing a reaction cup used to place a reaction cup; and the transport mechanism 104 has the above cup assignment station, for example, one of the reaction cup stations on the transport mechanism 104 is configured to be a cup assignment station. In one embodiment, the transport mechanism 104 may be of a plate structure.

The sample unit 33 is used to hold a sample. The sample unit 33 comprises a sample conveying module that comprises a sample delivery module (SDM) and a front-end track (not depicted in the figure).

The sample dispensing mechanism 3 is used to aspirate the sample and discharge the same into a reaction cup at the sample addition station. In one embodiment, the sample dispensing mechanism 3 comprises a sample pin, and one sample pin is provided. In one embodiment, the whole process of action of the sample dispensing mechanism 3 to complete one sample addition or dispensing is as follows: moving to a sample aspiration station to aspirate a sample, moving to a corresponding cleaning station to clean an outer wall, then moving to a sample addition station to discharge the aspirated sample to a reaction cup at the sample addition station, and finally moving to a corresponding cleaning station to clean inner and outer walls, e.g., the cleaning for the sample dispensing mechanism 3 can be performed at a sample pin cleaning unit 32.

The reagent unit 5 is used to hold a reagent. In one embodiment, the reagent unit 5 is configured to be of a circular plate structure, the reagent unit 5 has a plurality of positions for holding a reagent container, the reagent unit can rotate and drive a rotation of the reagent container held thereby and is used to rotate the reagent container to a reagent aspiration station so that the reagent is aspirated by the reagent dispensing mechanism 6. In one embodiment, one reagent unit 5 is provided, which can be arranged outside the reaction plate 4 in a separated manner.

The reagent dispensing mechanism 6 is used to aspirate the reagent and discharge the same into the reaction cup at the reagent addition station. In one embodiment, the reagent dispensing mechanism 6 comprises a reagent pin, and one reagent pin is provided. In one embodiment, the whole process of action of the reagent dispensing mechanism 6 to complete one reagent addition or dispensing is as follows: moving to a reagent aspiration station to aspirate a reagent, then moving to a corresponding cleaning station to clean an outer wall, then moving to a reagent addition station to discharge the aspirated reagent into a reaction cup at a reagent addition station, and finally moving to a corresponding cleaning station to clean inner and outer walls. In one embodiment, when the reagent pin is configured to continuously aspirate multiple reagents and then discharge the reagents together, the reagent pin is controlled to perform continuous multiple reagent aspiration operations to aspirate the multiple reagent needed. In the process of aspirating the multiple reagents as desired, after one reagent aspiration operation and before the next reagent aspiration operation, it is necessary to perform cleaning on the outer wall of the reagent pin, e.g., perform cleaning at a reagent pin cleaning tank unit 61.

The reaction plate 4 is configured to be of a circular plate structure, the reaction plate 4 is provided with a plurality of placement stations for placement of reaction cups, the reaction plate can rotate and drive a rotation of the reaction cups inside the placement stations so as to schedule the reaction cups in the reaction plate and incubate a reaction solution in the reaction cup. In one embodiment, the reaction plate 4 comprises an inner circle portion and an outer circle portion which can independently rotate or rotate together; the inner circle portion comprises one or more circles of tracks, each of which is provided with several placement stations used to incubate the reaction cups and schedule the reaction cups between the placement stations at the inner circle portion; and the outer circle portion comprises one or more circles of tracks, each of which is provided with several placement stations for scheduling the reaction cups between the placement stations at the outer circle portion. FIG. 2 shows an outer circle portion having one circle of track 4a, and an inner circle portion having three circles of tracks 4b, 4c, 4d. In one embodiment, one reaction plate 4 is provided. In one embodiment, the reaction plate is provided with a measurement station and/or a waste solution/liquid aspiration station; the measurement station is used to measure the reaction cup by the measurement unit 10, i.e., the reaction cup scheduled to the measurement station is measured by the measurement unit 10. In one embodiment, when the measurement unit 10 is an optical measurement unit, the measurement station is an optical measurement station; and for the reaction cup that has been measured, a waste solution is aspirated at the waste solution aspiration station. In one embodiment, the measurement station and the waste solution aspiration station are arranged at the outer circle portion of the reaction plate 4, e.g., the measurement station or the waste solution aspiration station is one placement station on the outer circle portion of the reaction plate 4, e.g., the measurement station 414 and the waste solution aspiration station 415 in FIG. 2. For the reaction cup that has been measured, a waste solution is aspirated at the waste solution aspiration station, so in one embodiment, the automatic analysis apparatus further comprises a waste solution aspiration unit 11 used to aspirate the reaction solution in the reaction cup that has been measured, and the waste solution aspiration unit includes a waste solution aspiration pin, with a trajectory of motion of the waste solution aspiration pin passing the waste solution aspiration station. In one embodiment, the reagent addition station is arranged inside the reaction plate, i.e., the reaction plate has a reagent addition station. In one embodiment, the reagent addition station is arranged at the outer circle portion of the reaction plate 4, e.g., the reagent addition station 412 in FIG. 2. In one embodiment, the sample addition station is arranged inside or outside the reaction plate 4, e.g., the sample addition station 31 arranged outside the reaction plate 4 as shown in FIG. 2.

The mixing mechanism 81 is used to mix the reaction solution to be mixed in the reaction cup. In FIG. 2, one mixing mechanism is provided; and in one embodiment, referring to FIG. 3, two mixing mechanisms may be provided, e.g., the mixing mechanism 81 and the mixing mechanism 82. In one embodiment, the two mixing mechanism may also be configured such that one of which receives a reaction cup in an odd-numbered cycle, and the other receives a reaction cup in an even-numbered cycle. It should be noted that if one of the mixing mechanisms is configured to receive a reaction cup in an odd-numbered cycle, it means that as long as a reaction cup that needs to be scheduled to the mixing mechanism appears in an odd-numbered cycle, the reaction cup will be scheduled to the mixing mechanism described above that receives a reaction cup in an odd-numbered cycle; and similarly, as long as a reaction cup that needs to be scheduled to the mixing mechanism appears in an even-numbered cycle, the reaction cup will be scheduled to the mixing mechanism described above that receives a reaction cup in an even-numbered cycle; and meanwhile, it does not mean that a reaction cup that needs to be scheduled to the mixing mechanism will appear in each cycle, for example, the mixing mechanism that is arranged to receive a reaction cup in an odd-numbered cycle may not be able to receive a reaction cup in every odd-numbered cycle, because it is possible that a reaction cup that needs to be scheduled to the mixing mechanism may not appear in some odd-numbered cycles. In one embodiment, the mixing mechanisms are arranged outside the reaction plate 4 in a separated manner. In one embodiment, the mixing mechanism can perform a non-mixing operation, a short mixing operation and a long mixing operation on a reaction cup, that is, the mixing operations of the mixing mechanism include three operations, i.e., the non-mixing operation, the short mixing operation and the long mixing operation.

The measurement unit 10 is used to measure the reaction solution to be measured. In one embodiment, the measurement unit 10 is an optical measurement unit, e.g., used to detect the light-emitting intensity of the reaction solution to be measured and calculate the concentration of components to be measured in the sample and the like. In one embodiment, the measurement unit 10 is arranged outside the reaction plate 4 in a separated manner.

The magnetic separation unit 91 is used to perform magnetic separation cleaning on the reaction solution in the reaction cup. In one embodiment, the magnetic separation unit 91 comprises a magnetic separation plate of a circular plate structure, the magnetic separation plate is provided with one or more circles of tracks for independent or simultaneous movement, each of the tracks comprises a plurality of placement stations for placement of reaction cups, the magnetic separation plate can rotate and drive a rotation of the reaction cups in the placement stations thereof and used to schedule a reaction cup inside the magnetic separation plate to a solution addition station and a solution aspiration station to perform magnetic separation cleaning. In one embodiment, the magnetic separation unit 91 is arranged outside the reaction plate 4 in a separated manner.

The transfer mechanism is used to at least schedule a reaction cup among the reaction cup loading mechanism 1, the reaction plate 4, the mixing mechanism 81 and the magnetic separation unit 91. In one embodiment, the transfer mechanism may comprise two cup grippers, e.g., the first cup gripper 2 and the second cup gripper 7.

The control unit is used to at least control operations and a time sequence of the sample dispensing mechanism 3, the reagent unit 5, the reagent dispensing mechanism 6, the reaction plate 4, the mixing mechanism, the measurement unit 10, the magnetic separation unit(s) and the transfer mechanism.

The cooperation between the mechanisms and units described above will be illustrated with a one-step test project as an example. Under control of the control unit, one reaction cup is scheduled from the cup assignment station of the reaction cup loading mechanism 1 to the sample addition station by the transfer mechanism, and the sample is aspirated, by the sample dispensing mechanism 3, from the sample unit 33 and then discharged into a reaction cup at the sample addition station, wherein the sample addition station may be arranged inside the reaction plate 4, i.e., the sample addition station is one placement station in the reaction plate 4, and the sample addition station may also be arranged outside the reaction plate 4. When the sample addition station is located outside the reaction plate 4, the reaction cup that is located at the sample addition station and after sample addition is scheduled to the reaction plate 4 by the transfer mechanism, the reagent is discharged into the reaction cup inside the reaction plate 4 by the reagent dispensing mechanism 6, the reaction cup is then further scheduled from the reaction plate 4 to the mixing mechanism by the transfer mechanism to perform the mixing operation, the reaction cup is then further scheduled from the mixing mechanism back to the reaction plate 4 by the transfer mechanism to perform incubation, and after incubation, the reaction cup is further scheduled from the reaction plate 4 to the magnetic separation unit by the transfer mechanism to perform magnetic separation cleaning, and the reaction cup after magnetic separation cleaning is then scheduled out from the magnetic separation unit by the transfer mechanism to perform the final measurement. In one embodiment, the reaction plate 4 may have a measurement station, and if the measurement unit 10 is an optical measurement unit, accordingly, the reaction plate 4 has an optical measurement station. In this case, the above reaction cup after magnetic separation cleaning is scheduled by the transfer mechanism from the magnetic separation unit back to the reaction plate 4, and when the reaction cup is scheduled by the reaction plate to the optical measurement station thereof, the reaction cup is subjected to optical measurement by the optical measurement unit.

For the scheduling of the reaction cup in the whole process of test, several positions associated with scheduling can be provided in the reaction plate 4, and the positions may be placement stations in the reaction plate 4. In one embodiment, the reaction plate 4 is provided with a reagent addition station, a first front operation station and a first rear operation station which are located at the outer circle portion, and a second rear operation station located at the inner circle portion, which will be specifically illustrated below.

When the sample addition station is located inside the reaction plate 4, the first front operation station is used to receive the reaction cup that is scheduled by the transfer mechanism from the cup assignment station to the reaction plate 4, and when the sample addition station is located outside the reaction plate 4, the first front operation station is used to receive the reaction cup that is scheduled by the transfer mechanism from the sample addition station to the reaction plate 4. The first rear operation station is used to schedule, by the transfer mechanism, the reaction cup to the mixing mechanism, or receive the reaction cup that is scheduled from the magnetic separation unit to the reaction plate by the transfer mechanism. The second rear operation station is used to schedule, by the transfer mechanism, the reaction cup to the magnetic separation unit.

For cooperating with the positions associated with scheduling in the reaction plate 4, in one embodiment, the transfer mechanism may comprise a first cup gripper 2 and a second cup gripper 7. In one embodiment, the first cup gripper 2 is configured such that a trajectory of motion passes a cup assignment station and a first front operation station, and when the sample addition station is located outside the reaction plate 4, the trajectory of motion of the first cup gripper 2 also passes the sample addition station. The second cup gripper 7 is configured such that the trajectory of motion passes the first rear operation station, the second rear operation station, the mixing mechanism and the magnetic separation unit.

When the sample addition station is located inside the reaction plate 4, the sample addition station and the first front operation station may be at the same position or at different positions; and when the sample addition station is located outside the reaction plate 4, the reagent addition station and the first front operation station may be at the same position or at different positions.

Figure 3:
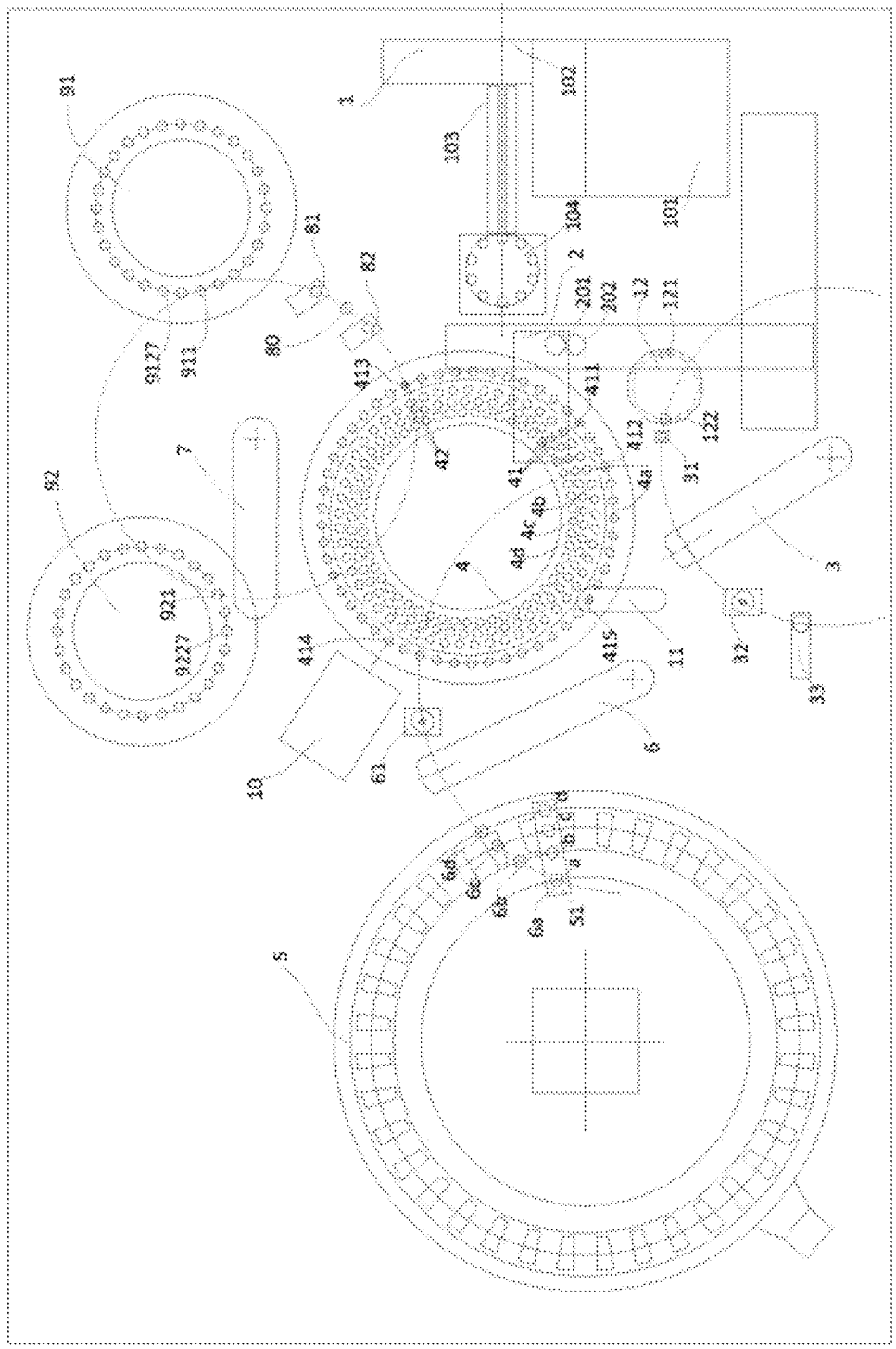
FIG. 3 is a structural schematic diagram of an automatic analysis apparatus of another embodiment.

Taking the case where the reagent addition station and the first front operation station are not located at the same position when the sample addition station is located outside the reaction plate 4 as an example, e.g., in FIG. 3, the scheduling and cooperation between the positions from the perspective of a test process of a one-step test project.

Under control of a control unit, one reaction cup is scheduled by the first cup gripper 2 from the cup assignment station of the reaction cup loading mechanism 1 to the sample addition station 31, a sample is aspirated from the sample unit 33 by the sample dispensing mechanism 3, and the aspirated sample is then discharged to a reaction cup at the sample addition station 31; the reaction cup after sampling is then scheduled by the first cup gripper 2 from the sample addition station 31 to the first front operation station 411 in the reaction plate 4, the reaction cup is scheduled by the reaction plate 4 from the first front operation station 411 to the reagent addition station 412, and a reagent is aspirated by the reagent dispensing mechanism from the reagent aspiration station of the reagent unit 5 and is then discharged into a reaction cup at the reagent addition station 412; the reaction cup is then scheduled by the reaction plate 4 to the first rear operation station 413, and the reaction cup is scheduled by the second cup gripper 7 from the first rear operation station 413 of the reaction plate 4 to the mixing mechanism, e.g., one of the mixing mechanisms 81, 82, to perform the mixing operation; after the mixing operation, the reaction cup is then scheduled by the second cup gripper 7 from the mixing mechanism to the second rear operation station 42 of the reaction plate to perform incubation; after incubation, when the reaction cup is not at the second rear operation station 42, the reaction plate 4 performs scheduling inside the reaction plate, the reaction cup is firstly scheduled to the second rear operation station 42, the reaction cup is then scheduled by the second cup gripper 7 from the second rear operation station 42 to the magnetic separation unit e.g., one of the magnetic separation units 91, 92, to perform magnetic separation cleaning; after the magnetic separation cleaning, the reaction cup is then scheduled by the second cup gripper 7 from the magnetic separation unit to the first rear operation station 413 of the reaction plate; then, in a predetermined substrate incubation period, the reaction cup may be just scheduled by the reaction plate 4 to the measurement station 414 to perform measurement by the measurement unit 10; and then, the reaction cup is scheduled by the reaction plate 4 from the measurement station 414 to the waste solution aspiration station 415, the waste solution in the reaction cup at the waste solution aspiration station 415 is aspirated by the waste solution aspiration unit 11, the reaction cup is then scheduled by the reaction plate 4 from the waste solution aspiration station 415 to the first front operation station 411, and then the first cup gripper 2 performs a cup discarding operation on the reaction cup, e.g., the reaction cup is discarded by the first cup gripper 2 from the first front operation station 411 to one of cup discarding holes 201, 202, the cup discarding hole 201 is coupled to a receiving apparatus containing waste cups, e.g., a waste tank 202 is also coupled to a receiving apparatus containing waste cups, the first cup gripper 2 can be controlled by the control unit to discard the reaction cup to be discarded from the first front operation station 411 to the cup discarding hole 201, and when the receiving apparatus, for containing waste cups, coupled to the cup discarding hole 201 is filled up, the control unit informs a user to replace the receiving apparatus and control the first cup gripper 2 to discard the reaction cup to be discarded from the first front operation station 411 to the cup discarding hole 202.

As described above, in the automatic analysis apparatus, some units and mechanisms are controlled by the control unit to perform corresponding operations according to the time sequence. In general, the operations are based on the operations of the units and mechanisms, with the cycle mentioned above as the unit. For example, after the cycle is set to be a specific period, the units and mechanisms need to complete a whole set of actions within such unit time of the cycle.

For the reaction cup loading mechanism 1, it is necessary to ensure that there is a cup in/at the cup assignment station in each cycle, e.g., in one cycle, after a cup at the cup assignment station is scheduled away, a new reaction cup is to be supplied and carried to the cup assignment station by the reaction cup loading mechanism 1.

For the sample dispensing mechanism 3, it is necessary to at least complete, in one cycle, a set of actions from sample aspiration to sample discharge to the reaction cup at the sample addition station.

For the reagent unit 5, it is necessary to complete, in one cycle, scheduling the reagent to be discharged to the reaction cup at the reagent station to the reagent aspiration station for aspiration by the reagent dispensing mechanism 6.

For the reagent dispensing mechanism 6, it is necessary to at least complete, in one cycle, a set of actions from reagent aspiration to reagent discharge to the reaction cup at the reagent addition station.

The reaction plate 4 completes a preset number of rotation of placement stations in one cycle, e.g., the reaction plate 4 at least completes scheduling of a reaction cup from the first front operation station 411 to the reagent addition station 413 in one cycle, and then scheduling the reaction cup after reagent addition from the reagent addition station 413 to the first rear operation station 413.

For the mixing mechanism, it is necessary to complete the mixing operation in one cycle.

The measurement operation is completed by the measurement unit 10 in one cycle.

When N magnetic separation units are provided, each of the magnetic separation units needs to advance by one cup station in N cycles, e.g., the reaction cup is rotated from the placement station thereof to the next adjacent placement station. When there are two magnetic separation units, each of the magnetic separation units needs to advance by one cup station in two cycles.

The waste solution aspiration unit 11 completes a waste solution aspiration operation on the reaction cup at the waste solution aspiration station.

The transfer mechanism is used to coordinate with the cycles of the mechanisms and units to schedule the reaction cup.

Taking the automatic analysis apparatus in FIG. 2 as an example, it can achieve the shortest cycle of 7.5 seconds in the industry, and accordingly the test speed is also very fast and is increased. At the moment/this time, the reaction cup loading mechanism 1, the first cup gripper 2, the sample dispensing mechanism 3, the reaction plate 4, the reagent unit 5, the reagent dispensing mechanism 6, the second cup gripper 7, the mixing mechanisms 81 and 82, the measurement unit 10 and the waste solution aspiration unit 11 have a cycle of 7.5 seconds. However, since two magnetic separation units 91 and 92 are comprised, each of the magnetic separation units can receive one reaction cup at an interval of 15 seconds and advance by one cup station, and thus each of the magnetic separation units has an actual operating cycle of 15 seconds; and if at the moment one magnetic separation unit is provided, the magnetic separation unit also has a cycle of 7.5 seconds, and the plate body of the magnetic separation unit is made to be relatively large, such that the machining difficulty and costs are increased, and the magnetic separation is difficult to guarantee and even impossible to achieve. Since FIG. 3 illustrates two independently operating magnetic separation units 91 and 92, one of which receives a reaction cup in an odd-numbered cycle, and the other of which receives a reaction cup in an even-numbered cycle, which has no limitation to fixed operating steps, and can be not only used for the first step of magnetic separation cleaning but also used for the second step of magnetic separation cleaning, thereby greatly increasing the test speed and test throughput of the whole machine.

The temporary storage portion 12 is arranged independent from the reaction plate 4 and is used to receive and temporarily store the reaction cup that is scheduled from the reaction plate by the transfer mechanism so as to wait to be scheduled back to the reaction plate again. The temporary storage portion being arranged independent from reaction plate 4 means that the operation of the temporary storage portion does not disturb the rotation of the reaction plate 4 itself. In one embodiment, the temporary storage portion is arranged outside the reaction plate 4 in a separated manner.

In one embodiment, the reaction plate 4 has the reagent addition station. The reagent dispensing mechanism 6 is configured to discharge a preset number of types of reagents at most into the reaction cup at the reagent addition station each time. When the number of types of reagents to be added to the reaction cup at the reagent addition station in this incubation is greater than the above preset number, after the reagent dispensing mechanism 6 is controlled by the control unit to add the preset number of types of reagents to the reaction cup, the reaction cup is scheduled to the temporary storage portion 12 by the transfer mechanism to perform temporary storage, and the reaction cup is then scheduled from the temporary storage portion 12 back to the reaction plate 4 to continue adding other reagents needed for this incubation. Of course, if the reaction cup is scheduled back to the reaction plate 4 and the number of types of other reagents needed for this incubation at the reagent addition station is still greater than the above preset number, after the reagent dispensing mechanism 6 is controlled by the control unit to add the preset number of types of reagents to the reaction cup, the reaction cup is scheduled to the temporary storage portion 12 by the transfer mechanism to perform temporary storage, and the reaction cup is then scheduled from the temporary storage portion 12 back to the reaction plate 4 to continue adding other reagents needed for this incubation, i.e., the preset number of types of reagents at most to be added to the reaction cup at the reagent addition station each time. For "the control unit controlling the reagent dispensing mechanism 6 to add a preset number of types of reagents to the reaction cup, the reaction cup is scheduled to the temporary storage portion by the transfer mechanism to perform temporary storage", in one embodiment, a reaction cup is firstly scheduled from the reagent addition station to the mixing mechanism, subjected to a non-mixing operation by the mixing mechanism, then scheduled back to the incubation position of the reaction plate 4, and scheduled from the reaction plate 4 to the temporary storage portion 12 to perform temporary storage without being incubated for a period of time. By means of the above process, a multi-component test project can be divided into several new one-step test processes to re-enter a test sequence and process, but it does not need to undergo magnetic separation cleaning and actual mixing and incubation.

However, for the existing multi-component reagent test project, as described above, in order to shorten the time for dispensing reagents, a solution of multiple reagent dispensing units arranged in parallel or series is generally used, so that the cost of whole machine is increased, the size of the whole machine is increased, and for most two-component projects, design of multiple reagent dispensing units is a redundant design. In one embodiment, the reagent dispensing mechanism 6 comprises one reagent pin, which can be configured to aspirate and discharge two reagents at most in one cycle, e.g., continuously aspirating two reagents and then discharging them together. When there are more than two reagents, the temporary storage portion is used, and the reaction cup after adding the two reagents is placed in the temporary storage portion and then scheduled back to the reaction plate 4 as a new one-step test to enter the process, which can not only ensure the smooth operation of the automatic analysis apparatus at high speed, but also realize the addition of multi-component reagents. The reaction plate is generally arranged inside a reaction kettle, and the reaction kettle has a reaction plate cover used to cover the reaction plate for heat preservation on the incubation position inside the reaction plate. However, in the solution of multiple reagent dispensing units in the related art, more holes are generally needed to be provided above the reaction plate, thereby causing the loss of temperature control effect of the reaction plate and increasing the energy loss.

When a test project for any reaction cup is a multi-step test project, in any step of test other than the last step of test, when the reaction cup needs to be performed magnetic separation cleaning in this step of test, the reaction cup after incubation in the reaction plate 4 is firstly scheduled to the magnetic separation unit 91 by the transfer mechanism to perform magnetic separation cleaning, and then the reaction cup after magnetic separation cleaning is scheduled from the magnetic separation unit 91 to the temporary storage portion to perform temporary storage; when the reaction cup in this step of test does not need to be performed magnetic separation cleaning, the reaction cup after incubation in the reaction plate 4 is scheduled from the reaction plate 4 to the temporary storage portion 12 by the transfer mechanism to perform temporary storage; and the reaction cup temporarily stored in the temporary storage portion 12 is then scheduled back to the reaction plate 4 to complete the subsequent steps of test. When the magnetic separation unit 91 is arranged outside the reaction plate 4 in a separated manner, the reaction cup after magnetic separation cleaning is scheduled from the magnetic separation unit 91 to the temporary storage portion 12 by the transfer mechanism to perform temporary storage, in which the reaction cup is firstly scheduled from the magnetic separation unit 91 to the reaction plate 4, and the reaction cup is then scheduled from the reaction plate 4 to the temporary storage portion 12. By means of the above process, a multi-step test project can be divided into several similar one-step test processes to re-enter a test sequence and process, which can not only ensure the smooth operation of the automatic analysis apparatus at high speed, but also realize a multi-step test project.

However, for the existing multi-component reagent test project, as described above, in order to shorten the time for dispensing reagents, a solution of multiple reagent dispensing units arranged in parallel or series is generally used, so that the cost of whole machine is increased, the size of the whole machine is increased, and for most two-component projects, design of multiple reagent dispensing units is a redundant design. In one embodiment, the reagent dispensing mechanism 6 comprises one reagent pin, which can be configured to aspirate and discharge two reagents at most in one cycle, e.g., continuously aspirating two reagents and then discharging them together. When there are more than two reagents, the temporary storage portion 12 is used, and the reaction cup after adding the two reagents is placed in the temporary storage portion 12 and then scheduled back to the reaction plate 4 as a new one-step test to enter the process, which can not only ensure the smooth operation of the automatic analysis apparatus at high speed, but also realize the addition of multi-component reagents. However, in the solution of multiple reagent dispensing units in the related art, more solution aspiration holes and sample addition holes are generally needed to be provided above the reaction plate, thereby causing the loss of temperature control effect of the reagent plate and the reaction plate and increasing the energy loss.

After a temporary storage portion is introduced, a multi-component test project can be divided into several processes similar to the one-step test process, and a multi-step test process can be divided into several new one-step test processes and re-enter the test sequence and process, so that the mechanisms and units and the control sequence can be designed according to a one-step test process, which is in a very standard and orderly manner, so as to solve the problem that multi-component test projects and multi-step test processes disturb normal processes, thereby effectively increasing the test speed and test throughput of the whole machine.

The temporary storage portion 12 can also solve the problem that the sample pre-dilution or pre-treatment processes disturb normal processes. In one embodiment, the sample addition station is arranged outside the reaction plate 4; and after a diluent or a pretreatment solution is added to the reaction cup at the reagent addition station by the reagent dispensing mechanism 6, the reaction cup is scheduled from the reaction plate 4 to the temporary storage portion 12 by the transfer mechanism to perform temporary storage, the diluted or pretreated sample is aspirated from the reaction cup by the sample dispensing mechanism 3 and discharged into a reaction cup at the sample addition station at the moment, and the transfer mechanism then performs the cup discarding operation on the reaction cup at the temporary storage portion 12.

In one embodiment, the temporary storage portion 12 has at least two temporary storage stations, and comprises a rotatable circular plate used to schedule a reaction cup between the temporary storage stations. For example, as shown in FIG. 2, the temporary storage portion 12 comprises at least two temporary storage stations 121 and 122, and taking an example in which 121 is a first temporary storage station, and 122 is a second temporary storage station, the first temporary storage station 121 of the temporary storage portion 12 is used to receive a reaction cup that is scheduled from the reaction plate 4 by the transfer mechanism, and then the reaction cup is scheduled to the second temporary storage station 122 by the temporary storage portion 12, so that the unoccupied first temporary storage station 121 can further receive a reaction cup that is scheduled from the reaction plate 4 by the transfer mechanism.

When the reaction cup scheduled to the second temporary storage station 122 further needs to perform a subsequent test, the reaction cup at the second temporary storage station 122 is scheduled back to the reaction plate 4 by the transfer mechanism, and when the reaction cup scheduled to the second temporary storage station 122 is the reaction cup to which the diluent or pretreatment solution is added by the reagent dispensing mechanism 6 when the reaction cup is previously at the reagent addition station, the diluted or pretreated sample is aspirated from the reaction cup by the sample dispensing mechanism 3 and is discharged into the reaction cup at the sample addition station at the moment, and the transfer mechanism then performs the cup discarding operation on the reaction cup at the second temporary storage station 122; or else, after a preset period of time, e.g., after one cycle, the reaction cup is then scheduled from the second temporary storage station 122 back to the first temporary storage station 121 by the temporary storage portion 12, when the reaction cup needs to perform a subsequent test, the reaction cup is scheduled back to the reaction plate by the transfer mechanism, and when a sample is aspirated from the reaction cup at the second temporary storage station, the transfer mechanism performs the cup discarding operation on the reaction cup at the first temporary storage station at the moment, e.g., the reaction cup is discarded into the cup discarding hole 202 or 201.

A reaction cup scheduling relationship is provided between the temporary storage portion 12 and the reaction plate 4, and in one embodiment, the first front operation station of the reaction plate 4 is further used to schedule out, by the transfer mechanism, the reaction cup that needs to be scheduled from the outer circle portion to the temporary storage portion, or used to receive the reaction cup that is scheduled from the temporary storage portion 12 to the reaction plate 4 by the transfer mechanism. In one embodiment, the reaction plate 4 further comprises a second front operation station that is used to schedule out, by the transfer mechanism, the reaction cup that is to be scheduled from the inner circle portion to the temporary storage portion. Accordingly, the first cup gripper 2 is configured such that a trajectory of motion thereof passes the cup assignment station, the temporary storage portion, the sample addition station, the first front operation station and the second front operation station; and the second cup gripper 7 is configured such that a trajectory of motion passes the first rear operation station, the second rear operation station, the mixing mechanism and the magnetic separation unit. When the temporary storage portion comprises at least two temporary storage stations, the transfer mechanism can be configured such that the trajectory of motion thereof passes one of the temporary storage stations, e.g., the first cup gripper 2 passes the first temporary storage station 121.

Taking FIG. 2 or 3 as an example, after being configured in this way, a certain reaction cup is scheduled from the incubation position in the reaction plate 4 to the temporary storage portion, the reaction cup in the inner circle portion is firstly scheduled by the reaction plate 4 to the first front operation station, e.g., the first front operation station 411 in FIG. 2, and the reaction cup is then scheduled from the first front operation station to the temporary storage portion by the first cup gripper 2. A certain reaction cup is scheduled from the magnetic separation unit to the temporary storage portion, then the reaction cup is firstly scheduled from the magnetic separation unit to the first rear operation station 413 of the reaction plate 4 by the second cup gripper 7, the reaction cup is then scheduled from the first rear operation station 413 to the first front operation station 411 by the reaction plate 4, and the reaction cup is then scheduled from the first front operation station 411 to the temporary storage portion by the first cup gripper 2.

A transfer mechanism is used to schedule a reaction cup between different units and mechanisms, and the reaction plate 4 is used to schedule the reaction cup between the placement stations inside the reaction plate 4. Therefore, from the perspective of the transfer mechanism, taking the first cup gripper 2 and the second cup gripper 7 as an example, when the sample addition station 31 is arranged outside the reaction plate 4, the first cup gripper 2 is used to schedule a reaction cup from the cup assignment station to the sample addition station 31 and schedule the reaction cup from the sample addition station 31 to the first front operation station 411; the first cup gripper 2 is further used to schedule a reaction cup between the first front operation station 411 and the temporary storage portion 12 and schedule the reaction cup from the second front operation station 41 to the temporary storage portion 12; and the second cup gripper 7 is used to schedule a reaction cup from the first rear operation station 413 to the mixing mechanism, from the mixing mechanism to the second rear operation station 42, from the second rear operation station 42 to the magnetic separation unit, and from the magnetic separation unit to the first rear operation station 413.

In one embodiment, the automatic analysis apparatus further comprises a transitional temporary storage portion; the first front operation station is further used to discard, by the transfer mechanism, the reaction cup that has been measured by the measurement unit 10; when the control unit detects that the reaction cup that has been measured is not discarded at the first front operation station by the transfer mechanism, the transfer mechanism is controlled by the control unit to stop scheduling the reaction cup from the temporary storage portion or the sample addition station to the first front operation station; and when the above reaction cup that has been measured but has not been discarded at the first front operation station is scheduled to the first rear operation station by the reaction plate, if a reaction cup after magnetic separation cleaning by the magnetic separation unit needs to be scheduled to the reaction plate at the moment, the reaction cup after cleaning by the magnetic separation unit is firstly scheduled to the transitional temporary storage portion by the transfer mechanism, and when the control unit detects that the first rear operation station is unoccupied, the reaction cup at the transitional temporary storage portion is then scheduled to the first rear operation station by the transfer mechanism.

In one embodiment, the automatic analysis apparatus further comprises a transitional discarding portion; the first front operation station is further used to discard, by the transfer mechanism, the reaction cup that has been measured by the measurement unit 10; when the control unit detects that the reaction cup that has been measured is not discarded at the first front operation station by the transfer mechanism, the transfer mechanism is controlled by the control unit to stop scheduling the reaction cup from the temporary storage portion or the sample addition station to the first front operation station; and when the above reaction cup that has been measured but has not been discarded at the first front operation station is scheduled to the first rear operation station by the reaction plate, the reaction cup is scheduled to the transitional discarding portion by the transfer mechanism to perform discarding. Taking FIG. 2 or 3 as an example, the component marked as 80 may be the transitional temporary storage portion or the transitional discarding portion.

The present disclosure further discloses an operating method for an automatic analysis apparatus. In one embodiment, the automatic analysis apparatus involved in the operating method may be the automatic analysis apparatus disclosed in any one embodiment of the present disclosure.

Figures 4, 5:
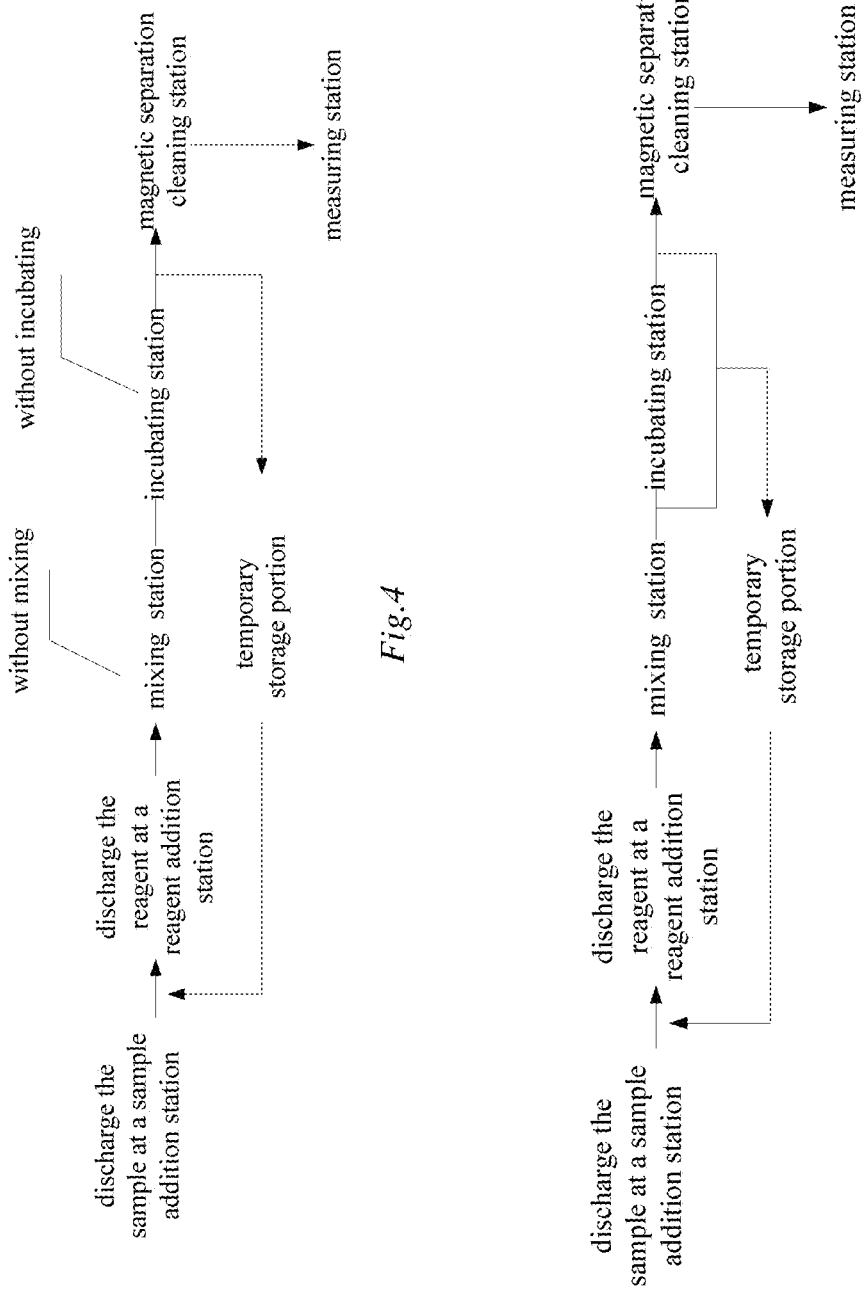
FIG. 4 is a schematic diagram of an operating method for an automatic analysis apparatus of one embodiment.
FIG. 5 is a schematic diagram of an operating method for an automatic analysis apparatus of another embodiment.

Referring to FIG. 4, in one embodiment, an operating method for an automatic analysis apparatus comprises:

firstly scheduling a reaction cup to a sample addition station to perform sample addition;

scheduling the reaction cup after sample addition to a reagent addition station in a reaction plate to perform reagent addition;

scheduling the reaction cup after reagent addition to a mixing mechanism;

scheduling the reaction cup from the mixing mechanism to a position for incubation in the reaction plate to perform incubation;
scheduling the reaction cup after incubation to a magnetic separation mechanism to perform magnetic separation cleaning; and
scheduling the reaction cup after magnetic separation cleaning back to the reaction plate by which the reaction cup is scheduled in the reaction plate to an optical measurement station to perform optical measurement;
wherein the reaction cup is added with a preset number of types of reagents at most at the reagent addition station in the reaction plate each time; when a number of types of reagents to be added to the reaction cup at the reagent addition station in this incubation is greater than the preset number, the reaction cup is added with the preset number of types of reagents; after this and before the reaction cup is added with other reagents needed for this incubation, the reaction cup is firstly scheduled to a temporary storage area independent from the reaction plate to perform temporary storage; the reaction cup is then scheduled from the temporary storage area back to the reaction plate to continue adding other reagents needed for this incubation. In one embodiment, the step, in which the reaction cup is scheduled from the temporary storage area back to the reaction plate, comprises: in the next cycle, scheduling the reaction cup from the temporary storage area back to the reaction plate.

In one embodiment, the step, in which when the number of types of reagents to be added to the reaction cup at the reagent addition station in this incubation is greater than the preset number, the reaction cup is added with the preset number of types of reagent; after this and before the reaction cup is added with other reagents needed for this incubation, the reaction cup is firstly scheduled to the temporary storage area independent from the reaction plate to perform temporary storage, comprises:
after the preset number of types of reagents is added to the reaction cup, scheduling the reaction cup from the reaction plate to the mixing mechanism;
scheduling the reaction cup from the mixing mechanism to the position for incubation in the reaction plate;
scheduling the reaction cup from the position for incubation in the reaction plate to the temporary storage area; and
scheduling the reaction cup from the temporary storage area back to the reaction plate to continue adding other reagents needed for this incubation.

The operating method as shown in FIG. 4 is conceived in that a multi-component test project is divided into several new one-step test processes, in which the temporary storage area is the starting point for each new one-step test so that the reaction cup is re-scheduled from the temporary storage area back to the reaction plate to re-enter the test sequence and process; and in general, a multi-component test project is divided into several new one-step test processes, the new one-step test process does not need to undergo magnetic separation cleaning and actual mixing and incubation, but of course, the last one-step test process needs to undergo magnetic separation cleaning and reagent mixing and incubation, and then it is ready for measurement.

Referring to FIG. 5, in one embodiment, an operating method for an automatic analysis apparatus comprises:
firstly scheduling a reaction cup to a sample addition station to perform sample addition;
scheduling the reaction cup after sample addition to a reagent addition station in a reaction plate to perform reagent addition;
scheduling the reaction cup after reagent addition to a mixing mechanism;
scheduling the reaction cup from the mixing mechanism to a position for incubation in the reaction plate to perform incubation;
scheduling the reaction cup after incubation to a magnetic separation mechanism to perform magnetic separation cleaning; and
scheduling the reaction cup after magnetic separation cleaning back to the reaction plate by which the reaction cup is scheduled in the reaction plate to an optical measurement station to perform optical measurement;
wherein when a test project for any reaction cup is a multi-step test project, in any step of test other than the last step of test, when the reaction cup needs to be performed magnetic separation cleaning in this step of test, the reaction cup after incubation in the reaction plate is firstly scheduled to the magnetic separation unit to perform magnetic separation cleaning, and then the reaction cup after magnetic separation cleaning is scheduled from the magnetic separation unit to the temporary storage area independent from the reaction plate to perform temporary storage; when the reaction cup in this step of test does not need to be performed magnetic separation cleaning, the reaction cup after incubation in the reaction plate is scheduled from the reaction plate to the temporary storage area independent from the reaction plate to perform temporary storage; and the reaction cup temporarily stored in the temporary storage area is then scheduled back to the reaction plate to perform other subsequent steps of test. In one embodiment, the step, in which the reaction cup is scheduled from the temporary storage area back to the reaction plate, comprises: in a next cycle, scheduling the reaction cup from the temporary storage area back to the reaction plate.

In one embodiment, the step, in which the reaction cup after magnetic separation cleaning is scheduled from the magnetic separation unit to the temporary storage area independent from the reaction plate to perform temporary storage, comprises: scheduling the reaction cup after magnetic separation cleaning from the magnetic separation unit to the reaction plate; and scheduling the reaction cup from the reaction plate to the temporary storage area.

The operating method as shown in FIG. 5 is conceived in that a multi-step test project is divided into several similar one-step test processes, in which the temporary storage area is the starting point for each new one-step test so that the reaction cup is re-scheduled from the temporary storage area back to the reaction plate to re-enter the test sequence and process, which can not only ensure the smooth operation of the automatic analysis apparatus at high speed, but also realize a multi-step test project.

It can be seen from the above description that by means of introducing a temporary storage area, both the multi-component test project and the multi-step test project are divided into several similar one-step test processes to re-enter the test sequence and process, so that the mechanisms and units and the control sequence can be designed according to a one-step test process, which is in a very standard and orderly manner.

In one embodiment, an operating method for an automatic analysis apparatus comprises: after a diluent or a pretreatment solution is added to the reaction cup at the reagent addition station, scheduling the reaction cup to the temporary storage area, aspirating the diluted or pretreated sample from the reaction cup and discharging the diluted or pretreated sample to a reaction cup at the sample addition station at the moment, then performing cup discarding treatment on the reaction cup in the temporary storage area, and scheduling the reaction cup at the sample addition station to the reaction plate to perform a subsequent test.

In one embodiment, the temporary storage area at least has a first temporary storage station and a second temporary storage station, and the reaction cup is scheduled between the first temporary storage station and the second temporary storage station by means of a rotatable circular plate; the first temporary storage station is used to receive a reaction cup that is scheduled from the reaction plate, and after the reaction cup is scheduled from the reaction plate to the first temporary storage station, the reaction cup is then scheduled to the second temporary storage station; when the reaction cup that is scheduled to the second temporary storage station further needs a subsequent test, the reaction cup at the second temporary storage station is scheduled back to the reaction plate; and when the reaction cup that is scheduled to the second temporary storage station is the reaction cup to which the diluent or pretreatment solution is added when the reaction cup is previously at the reagent addition station, the diluted or pretreated sample is aspirated from the reaction cup and discharged into the reaction cup at the sample addition station at the moment, and then a cup discarding operation is performed on the reaction cup at the second temporary storage station.

The temporary storage area involved in the operating method for an automatic analysis apparatus is the temporary storage portion 12 described above.

As described above, since a temporary storage portion is introduced, a multi-component test project can be divided into several processes similar to the one-step test process, and a multi-step test project can be divided into several new one-step test processes and re-enter the test sequence and process, so that the mechanisms and units and the control sequence can be designed according to a one-step test process, which is in a very standard and orderly manner, so as to solve the problem that multi-component test projects and multi-step test processes disturb normal processes, thereby effectively increasing the test speed and test throughput of the whole machine. A multi-component test project is divided into several similar one-step test processes, and a multi-step test process is divided into several new one-step test processes. In the new divided one-step test processes, some need to perform magnetic separation cleaning, but some do not need to perform magnetic separation cleaning. However, since the reaction plate is a core area in the whole test process, regardless of whether a certain one-step test process is subjected to magnetic separation cleaning, it will not disrupt the motion of the reaction plate in one cycle, so that the other mechanisms and units that coordinate with the reaction plate will not be disrupted, so the whole machine is in a very orderly manner and can operate at high speed.

In addition, since the temporary storage portion is introduced, a multi-component test project is divided into several similar one-step test processes, a multi-step test project is divided into several new one-step test processes, each of the new one-step test processes are further divided into several operations on a reaction cup, and the operations on the same reaction cup are not all continuous in time sequence, e.g., in a traditional solution, when multiple reagents are added, the reagents are respectively added to the reaction cup continuously in time sequence. Moreover, in the present disclosure, after the temporary storage portion is introduced, part of the reagents is firstly added to the reaction cup, and the reaction cup is then used to perform one-step test process, enters the temporary storage portion after several cycles, and then enters from the temporary storage portion to the reaction plate and is added with reagents. In the several cycles of the reaction cup, some other reaction cups are all successively added with the reagent, e.g., a first reaction cup is added with the reagent in a first cycle, a second reaction cup is added with the reagent in a second cycle, a third reaction cup is added with the reagent in a third cycle, . . . , the reaction cup is added with the remaining reagent(s) in a certain cycle, as such in the overall time sequence, there is a reaction cup to be added with the reagent in each cycle, which greatly shortens the cycle of reagent addition and increases the efficiency of reagent addition.

Taking the automatic analysis apparatus in FIG. 2 as an example, it can be seen that in the automatic analysis apparatus, the reaction plate 4 is located in a relatively central position, and other mechanisms and units are designed around the reaction plate 4, which can make full use of the table space of the automatic analysis apparatus. The structure of the reaction plate 4 and the motion thereof in one cycle will be described in detail below.

Taking FIG. 2 as an example, it can be seen that the reaction plate 4 in FIG. 2 has four circles of tracks, each of which has 53 reaction cup placement stations (cup stations). The outermost circle of track is configured as an outer circle portion, and the inner circles of tracks are configured as an inner circle portion. In one embodiment, in order to simplify the structural design and ensure the consistency of temperature control, the four circles of tracks are integrally formed, one temperature control unit is used, and the inner and outer circles are driven by one electric motor. As shown in FIG. 2, since the inner circle portion comprises three circles of tracks 4b, 4c, 4d, it can be seen that both the first cup gripper 2 and the second cup gripper 7 pass one placement station on the three circles of tracks 4b, 4c, 4d, and therefore one or more second front operation stations 41 may be provided; similarly, one or more second rear operation stations may be provided; and when multiple second rear operation stations 42 are provided, scheduling the reaction cup to the second rear operation stations 42 means that the reaction cup is scheduled to any one unoccupied placement station in/of the multiple second rear operation stations 42.

When the reaction plate 4 is in one cycle, the overall effect of motion is: a reaction cup at the first front operation station 411 is firstly scheduled to the reagent addition station 412 so that the reagent dispensing mechanism 6 performs a reagent addition operation, and the reaction cup after reagent addition is then scheduled from the reagent addition station 412 to the first rear operation station 413 so that the reaction cup is scheduled from the first rear operation station 413 to the mixing mechanism 81 or 82 by the second cup gripper 7. As described above, the overall effect of motion of the reaction plate 4 in one cycle is: the reaction cup is successively scheduled from the first front operation station 411 to the reagent addition station 412 and then scheduled to the first rear operation station 413. Since it also needs to coordinate with the temporary storage portion, some other rotation stopping actions for the reaction plate are added in the overall effect of motion to coordinate with temporary storage portion, etc. However, these other rotation stopping actions will not affect the overall effect of motion of the reaction plate 4 in one cycle. In summary, the reaction plate 4 successively has four rotation stopping actions. By these four rotation stopping actions, the cooperation with the temporary storage portion, etc. can be achieved while realizing the overall effect of motion. The time sequence of the four rotation stopping actions in one cycle successively comprises a first rotation stopping action, a second rotation stopping action, a third rotation stopping action and a fourth rotation stopping action, and the four rotation stopping actions will be described below.

In the first rotation stopping action,
- the reaction plate 4 stops for the first time, and the reaction cup that is located at the reagent addition station 412 and has been added with a diluent or a pretreatment solution is scheduled from the reagent addition station 412 to the first front operation station 411 so that the reaction cup is scheduled from the first front operation station 411 to the temporary storage portion 12 by the first cup gripper 2;
- or else, the reaction plate 4 stops for the first time, and the reaction cup that is located on the inner circle portion and needs to be scheduled to the temporary storage portion 12 is scheduled to the second front operation station 41 so that the reaction cup is scheduled from the second front operation station 41 to the temporary storage portion 12 by the first cup gripper 2, wherein the reaction cup that is located on the inner circle portion and needs to be scheduled to the temporary storage portion 12 may be, for example, the reaction cup that needs to be added with the remaining reagent in a multi-component test project or may be the reaction cup that needs to be subjected to the subsequent step of test in a multi-step test project;
- or else, the reaction plate 4 stops for the first time, and the reaction cup that is scheduled from the magnetic separation unit to the first rear operation station 413 of the reaction plate 4 by the second cup gripper 7 is scheduled from the first rear operation station 413 to the first front operation station 411 so that the reaction cup is scheduled from the first front operation station 411 to the temporary storage portion 12 by the first cup gripper 2; and for example, it may be a certain step of test in the multi-step test project, in which magnetic separation cleaning is needed, the reaction cup after magnetic separation cleaning needs to perform the subsequent step of test and thus needs to be scheduled from the magnetic separation unit to the temporary storage station, which is realized by means of the reaction plate.

After the first rotation stopping action of the reaction plate and before the second rotation stopping action, the reaction plate is stopped in this period of time, and the reaction cup is scheduled from the first front operation station 411 to the temporary storage portion 12 by the first cup gripper 2, or the reaction cup is scheduled from the second front operation station 41 to the temporary storage portion 12 by the first cup gripper 2. It should be noted that by means of the scheduling for all the test project, the two requirements "scheduling from the first front operation station 411 to the temporary storage portion 12" and "scheduling from the second front operation station 41 to the temporary storage portion 12" may not appear at the same time in each cycle, and at most only one of the two requirements can appear. In other words, there is at most one of the following three cases in one cycle:
- a first case: the reaction cup that is located at the reagent addition station 412 and has been added with a diluent or a pretreatment solution is scheduled from the reagent addition station 412 to the first front operation station 411 by means of the first rotation stopping action by the reaction plate 4, and at the moment the reaction cup needs to be scheduled from the first front operation station 411 to the temporary storage portion 12 by the first cup gripper 2;
- a second case: the reaction cup which needs to be scheduled to the temporary storage portion 12 is provided on the inner circle portion of the reaction plate 4 and is firstly scheduled to the second front operation station 41 by means of the first rotation stopping action by the reaction plate 4, and at the moment the reaction cup needs to be scheduled from the second front operation station 41 to the temporary storage portion 12 by the first cup gripper 2; and
- a third case: for the reaction cup that is scheduled from the magnetic separation unit to the first rear operation station 413 of the reaction plate 4 by the second cup gripper 7, if the reaction cup further needs to be subjected to the subsequent step of test (e.g., a reagent needs to be added) rather than being measured, the reaction plate 4 performs the first rotation stopping action, the reaction cup is scheduled from the first rear operation station 413 to the first front operation station 411, and at the moment the reaction cup needs to be scheduled from the first front operation station 411 to the temporary storage portion 12 by the first cup gripper 2.

In the second rotation stopping action, the reaction plate 4 stops for the second time, and the reaction cup that is located at the inner circle portion, has finished incubation and is to enter the magnetic separation cleaning is scheduled to the second rear operation station 42 so that the reaction cup is scheduled from the second rear operation station 42 to the magnetic separation unit 91 or 92 by the second cup gripper 7.

Similarly, after the second rotation stopping action of the reaction plate 4 and before the third rotation stopping action, the reaction plate is stopped in this period of time, and the reaction cup is scheduled from the second rear operation station 42 to the magnetic separation unit by the second cup gripper 7.

In the third rotation stopping action, the reaction plate 4 stops for the third time, and the reaction cup that is located at the outer circle portion and waits to be added with the reagent is scheduled to the reagent addition station 412 so that the reaction cup performs a reagent addition operation by the reagent dispensing mechanism 6.

Similarly, after the third rotation stopping action of the reaction plate 4 and before the fourth rotation stopping action, the reaction plate is stopped in this period of time, the aspirated reagent is at least discharged into the reaction cup at the reagent addition station 412 by the reagent dispensing mechanism in this period of time.

In the fourth rotation stopping action: the reaction plate 4 stops for the fourth time, and the reaction cup at the reagent addition station 412 after the third rotation stopping action is scheduled to the first rear operation station 413 so that the reaction cup is scheduled to the mixing mechanism by the second cup gripper 7.

The above four rotation stopping actions are all completed in one cycle.

In one cycle, if there is a reaction cup to be scheduled to the temporary storage portion, the reaction plate will perform the first rotation stopping action, otherwise the reaction plate will not perform the first rotation stopping action;
- in one cycle, if there is a reaction cup to be delivered from the reaction plate to the magnetic separation unit to perform magnetic separation cleaning, the reaction plate will perform the second rotation stopping action, otherwise the reaction plate will not perform the second rotation stopping action;

in one cycle, if there is a reaction cup to perform reagent addition, the reaction plate will perform the third rotation stopping action, otherwise the reaction plate will not perform the third rotation stopping action;

in one cycle, if there is a reaction cup after reagent addition is to be delivered from the reaction plate to the mixing mechanism to perform the mixing operation, the reaction plate will perform the fourth rotation stopping action, otherwise the reaction plate will not perform the fourth rotation stopping action; and in general, after the apparatus test is started, there is a reaction cup to perform reagent addition and to perform the mixing operation after reagent addition in each cycle, so there are the third rotation stopping action and the fourth rotation stopping action in each cycle, while whether the first rotation stopping action and the second rotation stopping action are performed is determined according to the actual needs of the reaction cup in each cycle.

Since there are both the third rotation stopping action and the fourth rotation stopping action in each cycle, due to the cooperation of the two rotation stopping actions, regardless of the reaction plate 4 performs the first rotation stopping action and/or the second rotation stopping action before the third rotation stopping action in this cycle, the number of advanced cup stations (placement stations) of the reaction plate 4 after the fourth rotation stopping action in this cycle is consistent as compared with that of the reaction plate after the fourth rotation stopping action in the last cycle, i.e., the reaction plate 4 advances a fixed number of cup stations in each cycle, e.g., as shown in FIG. 2, in each cycle, the reaction plate 4 advances 11 cup stations (placement stations) counterclockwise than the last cycle. Since the reaction plate 4 advances a fixed number of cup stations in each cycle, the time sequence can be designed such that when the reaction cup after magnetic separation cleaning in the magnetic separation unit and before measurement is scheduled to the first rear operation station 413 of the reaction plate 4, the period needed to reach the measurement station is also fixed, the period from the completion of measurement at the measurement station to the waste solution aspiration station is also fixed, and the period from the waste solution station to the first front operation station 411 to perform the cup discarding treatment is also fixed.

Therefore, after the fourth rotation stopping action of the reaction plate 4 in this cycle and before the first rotation stopping action of the reaction plate 4 in the next cycle, the reaction plate is stopped in this period of time, and thus the cup gripper performs scheduling in this period of time so that some reaction cups are scheduled out from the reaction plate 4, and some reaction cups are scheduled from the outside to the reaction plate 4. In one embodiment, specifically in this period of time, other units and mechanisms may perform the following actions:

if a reaction cup to be measured is at the measurement station, the measurement unit 10 will complete the measurement on the reaction cup in this period of time;

if a reaction cup after measurement is at the waste solution aspiration station, the waste solution aspiration unit 11 performs the waste solution aspiration operation on the reaction cup;

if a reaction cup after measurement is at the first front operation station 411, the reaction cup is scheduled from the first front operation station 411 to the cup discarding hole 201 or 202 by the first cup gripper 2 to perform cup discarding treatment; the reaction cup after sample addition at the sample addition station 31 is then scheduled from the sample addition station 31 to the first front operation station 411 by the first cup gripper 2, or else, the reaction cup that is located at the temporary storage portion and needs to perform the subsequent test (e.g., reagent addition) is scheduled from the temporary storage portion to the first front operation station 411 by the first cup gripper 2; it should be noted that by means of the scheduling for all the test projects, the two requirements "scheduling from the sample addition station 31 to the first front operation station 411" and "scheduling from the temporary storage portion to the first front operation station 411" may not appear at the same time in each cycle, and at most only one of the two requirements can appear;

if there is a reaction cup after the mixing operation, the reaction cup after the mixing operation is scheduled from the mixing mechanism to the second rear operation station 42 of the reaction plate by the second cup gripper 7; the reaction cup located at the first rear operation station 413 is scheduled to the mixing mechanism by the second cup gripper 7; and the reaction cup after magnetic separation cleaning is scheduled from the magnetic separation unit to the first rear operation station 413 of the reaction plate 4 by the second cup gripper 7.

This cycle is after the fourth rotation stopping action of the reaction plate 4, and before the first rotation stopping action of the reaction plate 4 in the next cycle.

After the fourth rotation stopping action of the reaction plate 4 in this cycle and before the first rotation stopping action of the reaction plate 4 in the next cycle, in this period of time, the above measurement unit, the waste solution aspiration unit 11, the first cup gripper 2 and the second cup gripper 7 are arranged in parallel around the reaction plate 4.

As described above, there are generally the third rotation stopping action and the fourth rotation stopping action in each cycle, and the first rotation stopping action and the second rotation stopping action are performed according to the requirement of the reaction cup.

The function of the third rotation stopping action and the fourth rotation stopping action is to schedule the reaction cup to be added with a reagent to the reagent addition station to perform the reagent addition operation, and schedule the reaction cup after reagent addition to the first rear operation station so that the reaction cup is scheduled to the mixing mechanism by the second cup gripper 7; the first rotation stopping action is reserved to divide a multi-component test project and a multi-step test project into several new one-step test processes; and the second rotation stopping action is used to schedule the reaction cup that has finished incubation and needs to be performed magnetic separation cleaning to the magnetic separation unit. Therefore, from the perspective of each cycle, the reaction plate 4 comprises two fixed rotation stopping actions (the third rotation stopping action and the fourth rotation stopping action) and two possible rotation stopping actions (the first rotation stopping action and the second rotation stopping action), and the rotation stopping actions in each cycle are all as such and are very standardized, no other abnormal stopping will occur, and regardless of whether a certain one-step test process needs to perform magnetic separation cleaning, the rotation stopping action of the reaction plate 4 in each cycle will not be disturbed, because the second rotation stopping of the reaction plate 4 is reserved to determine whether it needs to perform magnetic separation cleaning. In addition, since both the two fixed rotation stopping actions (the third rotation stopping action and the fourth rotation stopping action) of the reaction plate 4 wait for the motion of the reagent plate and the reagent aspiration of the reagent dispensing mechanism, both the two fixed rotation stopping actions (the third rotation stopping action and the fourth rotation stopping action) of the reaction plate 4 are performed in a later period of time in one cycle. Since even the third rotation stopping action is performed at the beginning of one cycle, the reaction plate 4 still has to wait for the reagent aspiration and other operations of the reagent dispensing mechanism, taking this case into consideration, making full use of the period of time during which the reaction plate 4 wait for the reagent aspiration of the reagent dispensing mechanism, this period of time is reserved for the first rotation stopping action and the second rotation stopping action, so that it does not extend the period of each cycle. In addition, in the period reserved for the first rotation stopping action and the second rotation stopping action in each cycle, the multi-component test project and the multi-step test project are divided into some operations to be performed in several new one-step test processes. From the perspective of each cycle, it is equivalent to performing, in parallel in each cycle, the reagent addition operation and some operations to be performed in several new one-step test processes into which the multi-component test project and the multi-step test project is divided, so that the efficiency and speed are significantly increased, and the reaction plate and other mechanisms and units will not wait for or cannot complete the operations to be completed in the cycle due to the reagent addition operation or due to the some operations to be performed in several new one-step test processes into which the multi-component test project and the multi-step test project are divided.

In one embodiment, an operating method for an automatic analysis apparatus comprises: after a test is started, controlling the magnetic separation units to receive the reaction cup in respective corresponding cycles, wherein when N magnetic separation units are provided, a reaction cup receiving cycle corresponding to the ith magnetic separation unit is a (kN+i)th cycle; where N is an integer greater than or equal to 2, k is an integer greater than or equal to 0, the value of i is in a range of 1 to N, and i is an integer. For example, three magnetic separation units are provided, including a first magnetic separation unit, a second magnetic separation unit and a third magnetic separation unit, so the reaction cup receiving cycle of the first magnetic separation unit is an arithmetic sequence of 1, 4, 7, 10 . . . , the reaction cup receiving cycle of the second magnetic separation unit is an arithmetic sequence of 2, 5, 8, 11 . . . , and the reaction cup receiving cycle of the third magnetic separation unit is an arithmetic sequence of 3, 6, 9, 12 . . . . In one embodiment, two magnetic separation units are provided, the two magnetic separation units are controlled to receive the reaction cup in the respective corresponding cycles, the reaction cup receiving cycle corresponding to one of the magnetic separation units is an odd-numbered cycle, and the reaction cup receiving cycle corresponding to the other magnetic separation unit is an even-numbered cycle. In one embodiment, the control unit may perform scheduling on all the test projects according to the related algorithm, so that at most one reaction cup that has finished incubation and is to perform separation cleaning will appear in each cycle, or else only one reaction cup that has finished incubation and is to perform separation cleaning will appear, so that the magnetic separation units that operate independently can be utilized to the maximum extent.

The present disclosure uses a structure of multiple magnetic separation units and an operating method thereof, which not only contributes to the test speed, but also has flexibility and interchangeability that cannot be achieved by other solutions.

The specific magnetic separation cleaning process of the magnetic separation unit will be described below.

In one embodiment, the operating method further comprises: after the magnetic separation unit receives a reaction cup, the reaction cup is subjected to Y-stage magnetic separation cleaning; where Y is an integer greater than or equal to 1; and for any order of magnetic separation cleaning, it comprises: adding a separation solution to the reaction cup to perform magnetic separation cleaning for the reaction solution in the reaction cup; then performing solution aspiration for the reaction cup so as to complete magnetic separation cleaning of this order; and allowing the reaction cup that has finished the Y-stage magnetic separation cleaning to wait for being dispatched out of the magnetic separation unit, or adding a substrate to the reaction cup that has finished the Y-stage magnetic separation cleaning and waiting for being dispatched out of the magnetic separation unit. For example, in the magnetic separation cleaning of a one-step test project and in the magnetic separation cleaning of the last step of a multi-step test project, a substrate needs to be added, because the next process of the reaction cup is the measurement, e.g., the optical measurement at the optical measurement station by the optical measurement unit; and however, for other magnetic separation cleaning, e.g., in a multi-step test project, in any other one-step test other than the last one-step test, it does not need to add a substrate after magnetic separation cleaning, so the reaction cup should be subjected to the subsequent steps of test.

Figure 6:
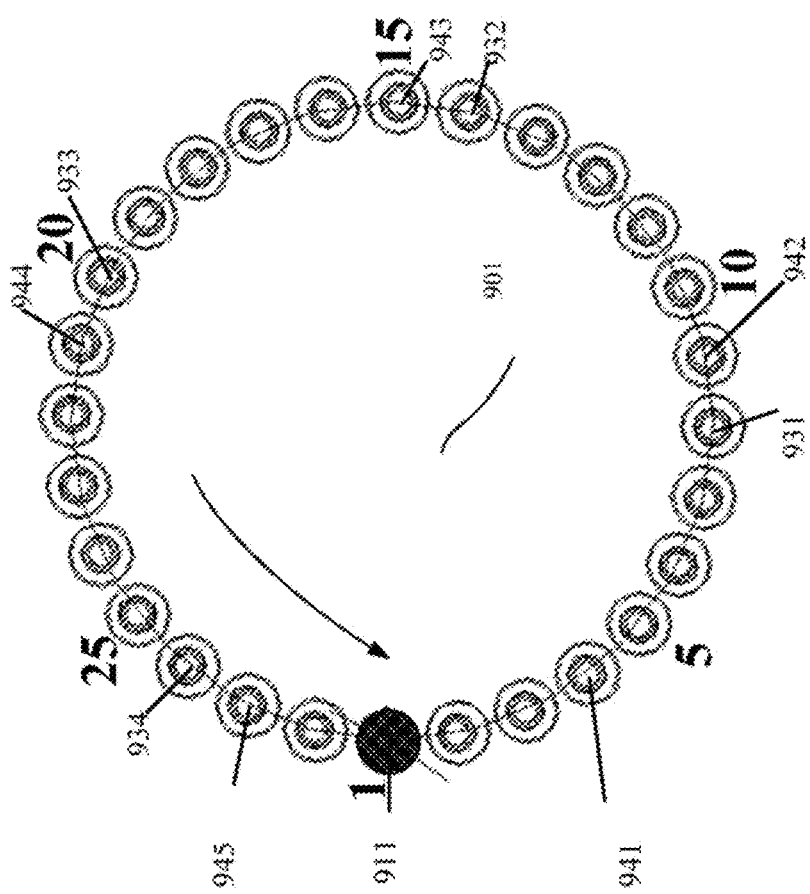
FIG. 6 is an illustration of a placement station of a four-stage magnetic separation plate of the magnetic separation unit in FIG. 3.

Taking the magnetic separation unit 91 or 92 in FIG. 3 as an example, the specific operation process of the magnetic separation unit is illustrated. Referring to FIG. 6 and table 1, FIG. 6 is an illustration of a four-stage magnetic separation plate of the magnetic separation unit in FIG. 3. The cup station in table 1 refers to the placement station on the magnetic separation plate for placement of a reaction cup.

TABLE 1

| Cup station | Magnetic separation solution aspiration and injection action | Action of magnetic separation plate 901 |
|---|---|---|
| 1 | Operation station for a reaction cup to move in and out of a magnetic separation plate | Advance one cup station counterclockwise every two cycles |
| 2, 3 | Two cup stations | Advance two cup stations counterclockwise |
| 4 | Inject a separation solution into a reaction cup by a first-stage solution-injection pin 941, with magnets being distributed on a magnetic separation kettle 907 outside the cup station, and start magnetic separation on a reaction solution | Advance one cup station counterclockwise |
| 5-7 | Magnets distributed on the magnetic separation kettle 907 outside the cup station, and magnetic separation | Advance three cup stations counterclockwise |
| 8 | Magnets are distributed on the magnetic separation kettle 907 outside the cup station, and under a magnetic field, a first-stage magnetic separation solution-aspiration pin 931 is driven by a driving motor 905 to descend to the | Advance one cup station counterclockwise |

TABLE 1-continued

| Cup station | Magnetic separation solution aspiration and injection action | Action of magnetic separation plate 901 |
|---|---|---|
|  | bottom of the cup for solution aspiration and is controlled to start a first magnetic separation solution-aspiration peristaltic pump at the same time |  |
| 9 | A separation solution is injected into a reaction cup by a second-stage solution-injection pin 942, and the reaction cup is driven by a mixing belt 906 to rotate for mixing | Advance one cup station counterclockwise |
| 10-13 | Magnetic separation | Advance four cup stations counterclockwise |
| 14 | Under a magnetic field, a second magnetic separation solution-aspiration pin 932 descends to the bottom of the cup for solution aspiration | Advance one cup station counterclockwise |
| 15 | A separation solution is injected by a third-stage solution-injection pin 943, and mixing belt 906 rotates for mixing | Advance one cup station counterclockwise |
| 16-19 | Magnetic separation | Advance four cup stations counterclockwise |
| 20 | Under a magnetic field, a third-stage solution-aspiration pin 933 performs solution aspiration | Advance one cup station counterclockwise |
| 21 | A separation solution is injected by a fourth-stage solution-injection pin 944, and mixing belt 906 rotates for mixing | Advance one cup station counterclockwise |
| 22-25 | Magnetic separation | Advance four cup stations counterclockwise |
| 26 | Under a magnetic field, a fourth-stage solution-aspiration pin 934 performs solution aspiration | Advance one cup station counterclockwise |
| 27 | A substrate is injected by a substrate injection pin 945, and mixing belt 906 rotates for mixing | Advance one cup station counterclockwise |
| 28 | One cup station | Advance one cup station counterclockwise, and return to a magnetic separation plate operation station 911 |

According to the present disclosure, by means of the alternate operation of the two magnetic separation plates and the matching in test cycle with other units and mechanisms, the test speed and the reliability of whole machine are increased.

In order to improve the understanding of the present disclosure, taking the automatic analysis apparatus in FIG. 3 as an example below, the processes of a two-component one-step test project, a three-component one-step test project, a two-step one-separation test project and a two-step two-separation test project are respectively specifically illustrated.

Taking the automatic analysis apparatus in FIG. 3 as an example, the cycle is 7.5 seconds, the magnetic separation unit 91 is used to receive a reaction cup in an even-numbered cycle, and the magnetic separation unit 92 is used to receive a reaction cup in an odd-numbered cycle; the mixing mechanism 81 is used to receive a reaction cup in an even-numbered cycle, and the mixing mechanism 82 is used to receive a reaction cup in an odd-numbered cycle; and the processes of a two-component one-step test project, a three-component one-step test project, a two-step one-separation test project and a two-step two-separation test project are respectively specifically illustrated below.

Referring to the figure, the process of a two-component one-step test project is firstly illustrated, in which the reagent dispensing mechanism 6 is configured to add two reagents at most to a reaction cup at the reagent addition station 412 each time.

Cycle 1: a new reaction cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is scheduled from the sample addition station 31 to the first front operation station 411 at the outer circle portion of the reaction plate by the first cup gripper 2, and the reaction plate rotates to take the reaction cup to be added with a reagent to the reagent addition station 412; a first reagent may be aspirated by the reagent pin, a second reagent is then aspirated after the outer wall is cleaned, and the two reagents are then discharged together into the reaction cup at the reagent addition station 412; and the reaction plate then rotates to schedule the reaction cup after reagent addition to the first rear operation station 413, the reaction cup is scheduled from the first rear operation station 413 to the available mixing mechanism 81 or 82 by the second cup gripper 7, and if the mixing mechanism 81 is configured to receive the reaction cup in an even-numbered cycle, the reaction cup is received by the mixing mechanism 81 at the moment, i.e., the reaction cup is scheduled from the first rear operation station 413 to the available mixing mechanism 81 by the second cup gripper 7.

Cycle 3: the mixing mechanism 81 performs a mixing operation on the above reaction cup.

Cycle 4: in this cycle or at the end of the last cycle, the reaction cup after mixing is grabbed from the mixing mechanism 81 back to the second rear operation station 42 at the inner circle portion of the reaction plate by the second cup gripper 7 and is then incubated;

the reaction cup is incubated at the inner circle portion of the reaction plate for a predetermined time according to the needed incubation time;

after incubation in the reaction plate, the reaction cup is rotated to the second rear operation station 42, grabbed by the second cup gripper 7, and placed into an available magnetic separation unit 91 or 92 to perform magnetic separation cleaning; and a substrate is injected after magnetic separation cleaning, and the reaction cup is scheduled to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed. It should be noted that by means of the configuration of the time sequence and the number of cup stations at the outer circle portion of the reaction plate, after the reaction cup is scheduled to the first rear operation station 413, when it advances to the optical measurement station 414, the substrate has been incubated at the moment; and the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

The process of a three-component one-step test project is then illustrated. Taking a one-step project as an example, it needs to add three reagents, including a, b and c, in which two components (a+b) are added in the first time, and one component (c) is added in the second time, the process being as follows.

Cycle 1: a new cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is scheduled from the sample addition station 31 to the first front operation station 411 at the outer circle portion of the reaction plate by the first cup gripper 2, and the reaction plate rotates to take the reaction cup to be added with a reagent to the reagent addition station 412; at the same time, one cavity a of a needed reagent bottle 51 is rotated by the reagent unit 5 for a reagent pin solution aspiration station 6a, inner and outer walls of the reagent pin are cleaned, a first component a is aspirated, the reagent pin then returns to the reagent pin cleaning tank unit 61, and in order to prevent the first component from being carried into the reagent cavity of the next component to contaminate the reagent, cleaning is performed on the outer wall; at the same time, the other cavity b of the reagent bottle 51 is rotated by the reagent unit to a corresponding reagent pin solution aspiration station 6b, a component b is aspirated by the reagent pin, the reagent pin then moves to a position above the reaction plate 4, and the reagents a+b are discharged into the reaction cup at the reagent addition station 412 of the reaction plate 4; and the reaction plate rotates counterclockwise, the reaction cup is scheduled from the reagent addition station 412 at the outer circle portion to the first rear operation station 413, and the reaction plate 4 advances 11 cup stations counterclockwise in each cycle, so that the reaction cup is scheduled from the first rear operation station 413 to the available mixing mechanism 81 or 82 by the second cup gripper 7.

Cycle 3: the mixing mechanism 81 or 82 will not perform mixing, but only perform temporary storage, on the above reaction cup, because the reagent has not been fully added. Of course, this is also possible if the mixing is performed.

Cycle 4: in this cycle or at the end of the last cycle, the reaction cup temporarily stored on the mixing mechanism 81 or 82 is grabbed back to the second rear operation station 42 at the inner circle portion of the reaction plate 4 by the second cup gripper 7; and in this cycle, according to the scheduling, at a specified point of time in this cycle, e.g., the above first rotation stopping action of the reaction plate, the reaction cup is scheduled to the second front operation station 41 by the reaction plate, the reaction cup is transported to the temporary storage station 121 of the temporary storage portion 12 (or the temporary storage plate 12) by the first cup gripper 2 to perform temporary storage, and the temporary storage plate 12 rotates to schedule the reaction cup to the temporary storage station 122, where the rotation action of the temporary storage plate 12 is an action designed for the sample pre-dilution and pre-treatment process, and considering that one dilution or pretreatment test may be followed in the next cycle, the rotation action of the temporary storage plate 12 will be reserved here.

Cycle 5: in this cycle, the sample pin stops starting a new test, the reaction cup at the temporary storage station 122 is transported to the first front operation station 411 at the outer circle portion of the reaction plate 4 by the first cup gripper, the reaction plate rotates to take the reaction cup to be added with a reagent to the reagent addition station 412, and at the same time, one cavity c of the needed reagent bottle 51 is rotated to a reagent pin solution aspiration station 6c by the reagent unit 5, the inner and outer walls of the reagent pin are cleaned, a component c is aspirated, and then the reagent pin moves to a position above the reaction plate 4 to discharge the component c into the reaction cup at the reagent addition station 412 of the reaction plate 4; and the reaction plate rotates counterclockwise, the reaction cup is scheduled from the reagent addition station 412 at the outer circle portion to the first rear operation station 413, and the reaction plate 4 advances 11 cup stations counterclockwise in each cycle, so that the reaction cup is grabbed to the available mixing mechanism 81 or 82 by the second cup gripper 7.

Cycle 6: the mixing mechanism performs mixing;

Cycle 7: in this cycle or at the end of the last cycle, the reaction cup after mixing is grabbed from the mixing mechanism 81 or 82 back to the second rear operation station 42 at the inner circle portion of the reaction plate by the second cup gripper 7 and is then incubated;

the reaction cup is incubated at the inner circle portion of the reaction plate for a predetermined time according to the needed incubation time;

after incubation of the reaction cup in the reaction plate, the reaction cup is rotated to the second rear operation station 42, grabbed by the second cup gripper 7, and placed into an available magnetic separation unit 91 or 92 to perform magnetic separation cleaning; and a substrate is injected after magnetic separation cleaning, and the reaction cup is scheduled to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed; and the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

The above is the test process of a one three-component one-step project. Regardless of a one-step test project, a multi-step test project, or a test process of sample pre-dilution or pre-treatment, as long as the number of types of reagents components to be added in a certain step of test is greater than the preset number of types of reagents (e.g., the above two types) of the reagent dispensing mechanism 6, the test project may be divided into several new one-step test processes to add the reagent in multiple steps.

The process of a two-step one-separation test project is then illustrated.

Cycle 1: a new cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is scheduled from the sample addition station 31 to the first front operation station 411 at the outer circle portion of the reaction plate by the first cup gripper 2, the reaction cup is then scheduled to the reagent addition station 412, and the reaction cup after reagent addition is scheduled from the reagent addition station 412 to the first rear operation station 413.

If the case 1 occurs, i.e., in this cycle, a reaction cup at the inner circle portion of the reaction plate 4 needs to be scheduled to the second front operation station 41 of the inner circle portion, e.g., a reaction cup needs to be scheduled from the inner circle portion of the reaction plate 4 to the temporary storage portion, the reaction cup needs to be firstly scheduled to the second front operation station 41 of the inner circle portion so that the first cup gripper 2 performs grabbing; therefore, the reaction plate 4 will firstly perform the above first rotation stopping action to schedule the relevant reaction cup to the second front operation station 41 of the inner circle portion so that the reaction cup is grabbed to the temporary storage portion by the first cup gripper 2, and then perform the above third rotation stopping action to schedule the reaction cup after sample addition to the reagent addition station 412 at the outer circle portion of the reaction plate.

If the case 2 occurs, i.e., in this cycle, a reaction cup on the inner circle portion of the reaction plate 4 is to be scheduled to the second rear operation station 42, e.g., a reaction cup after incubation needs to be performed magnetic separation cleaning and thus needs to be scheduled to the magnetic separation unit, the reaction cup needs to be firstly scheduled to the second rear operation station 42 so that the reaction cup is scheduled to the magnetic separation unit by the second cup gripper 7; therefore, the reaction plate 4 will firstly perform the above second rotation stopping action to schedule the relevant reaction cup to the second rear operation station 42 of the inner circle portion so that the reaction cup is scheduled to the magnetic separation unit by the second cup gripper 7, and then perform the above third rotation stopping action to schedule the reaction cup after sample addition to the reagent addition station 412 at the outer circle portion of the reaction plate.

If both the above cases 1 and 2 occur, the reaction plate 4 will successively perform the above first rotation stopping action, the second rotation stopping action and the third rotation stopping action.

In any case, after the third rotation stopping action, the fourth rotation stopping action will be performed in this cycle to schedule the reaction cup after reagent addition from the reagent addition station 412 to the first rear operation station 413.

Cycle 3: the mixing mechanism 81 or 82 performs mixing;

Cycle 4: in this cycle or at the end of the last cycle, the reaction cup after mixing is grabbed back to the second rear operation station 42 at the inner circle portion of the reaction plate 4 by the second cup gripper 7 and is then incubated;

the reaction cup is incubated at the inner circle portion of the reaction plate for a predetermined time according to the needed incubation time; and after incubation of the reaction cup in the reaction plate, according to the scheduling (e.g., the above first rotation stopping action of the reaction plate), the reaction cup is scheduled to the second front operation station 41 by the reaction plate and is picked from the inner circle portion of the reaction plate by the first cup gripper 2 and placed into the temporary storage station 121 on the temporary storage plate 12 to perform temporary storage, and the temporary storage plate 12 rotates one cup station.

A next cycle as followed: the reaction cup is transported from the temporary storage station 122 to the first front operation station 411 at the outer circle portion of the reaction plate 4 by the first cup gripper, the reaction plate rotates to take the reaction cup to be added with a reagent to the reagent addition station 412. Similarly, if the reaction plate further has other scheduling actions (i.e., the above first rotation stopping action and second rotation stopping action of the reaction plate), the reaction cup will be scheduled to a further position at the outer circle portion and then scheduled from the further position to the reagent addition station 412, so that although there is a change in path, the final effect of scheduling is to schedule the reaction cup from the first front operation station 411 to the reagent addition station 412. A reagent is added to the reaction cup by the reagent dispensing mechanism 6, the reagent dispensing mechanism 6 is lifted after the solution discharge action, the reaction plate 4 rotates counterclockwise to schedule the reaction cup from the reagent addition station 412 to the first rear operation station 413 and at the same time enable the reaction plate 4 to advance 11 cup stations counterclockwise in each cycle, and the reaction cup is grabbed to the available mixing mechanism 81 or 82 by the second cup gripper 7.

A further next cycle: the mixing mechanism 81 or 82 performs mixing;

A further next cycle: in this cycle or at the end of the last cycle, the reaction cup after mixing is grabbed back to the inner circle cup station of the second rear operation station 42 of the reaction plate by the second cup gripper and is then incubated;

the reaction cup is incubated at the inner circle portion of the reaction plate for a predetermined time according to the needed incubation time;

after incubation of the reaction cup in the reaction plate, the reaction cup is scheduled to the second rear operation station 42 (e.g., the second rotation stopping action of the reaction plate 4) by the reaction plate 4, and the reaction cup is grabbed out by the second cup gripper 7 and placed into the available magnetic separation unit 91 or 92 to perform magnetic separation cleaning; and a substrate is injected after magnetic separation cleaning, and the reaction cup is scheduled to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed; and the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

The process of a two-step two-separation test project is then illustrated.

Cycle 1: a new cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is scheduled from the sample addition station 31 to the first front operation station 411 at the outer circle portion of the reaction plate by the first cup gripper 2, the reaction cup is then scheduled to the reagent addition station 412, and the reaction cup after reagent addition is scheduled from the reagent addition station 412 to the first rear operation station 413.

If the case 1 occurs, i.e., in this cycle, a reaction cup at the inner circle portion of the reaction plate 4 needs to be scheduled to the second front operation station 41 of the inner circle portion, e.g., a reaction cup needs to be scheduled from the inner circle portion of the reaction plate 4 to the temporary storage portion, the reaction cup needs to be firstly scheduled to the second front operation station 41 of the inner circle portion so that the first cup gripper 2 performs grabbing; therefore, the reaction plate 4 will firstly perform the above first rotation stopping action to schedule the relevant reaction cup to the second front operation station 41 of the inner circle portion so that the reaction cup is grabbed to the temporary storage portion by the first cup gripper 2, and then perform the above third rotation stopping action to schedule the reaction cup after sample addition to the reagent addition station 412 at the outer circle portion of the reaction plate.

If the case 2 occurs, i.e., in this cycle, a reaction cup on the inner circle portion of the reaction plate 4 is to be scheduled to the second rear operation station 42, e.g., a reaction cup after incubation needs to be performed magnetic separation cleaning and thus needs to be scheduled to the magnetic separation unit, the reaction cup needs to be firstly scheduled to the second rear operation station 42 so that the reaction cup is scheduled to the magnetic separation unit by the second cup gripper 7; therefore, the reaction plate 4 will firstly perform the above second rotation stopping action to schedule the relevant reaction cup to the second rear operation station 42 of the inner circle portion so that the reaction cup is scheduled to the magnetic separation unit by the second cup gripper 7, and then perform the above third rotation stopping action to schedule the reaction cup after sample addition to the reagent addition station 412 at the outer circle portion of the reaction plate.

If both the above cases 1 and 2 occur, the reaction plate 4 will successively perform the above first rotation stopping action, the second rotation stopping action and the third rotation stopping action.

In any case, after the third rotation stopping action, the fourth rotation stopping action will be performed in this cycle to schedule the reaction cup after reagent addition from the reagent addition station 412 to the first rear operation station 413.

Cycle 3: the mixing mechanism 81 or 82 performs mixing;

Cycle 4: in this cycle or at the end of the last cycle, the reaction cup after mixing is grabbed back to the second rear operation station 42 at the inner circle portion of the reaction plate 4 by the second cup gripper 7 and is then incubated;

the reaction cup is incubated at the inner circle portion of the reaction plate for a predetermined time according to the needed incubation time;

after incubation of the reaction cup in the reaction plate, according to the scheduling (e.g., the above second rotation stopping action of the reaction plate 4), the reaction cup is scheduled to the second rear operation station 42 by the reaction plate and is picked out by the second cup gripper 7 and placed into the available magnetic separation unit 91 or 92 to perform magnetic separation cleaning; and after magnetic separation cleaning, the reaction cup after the first magnetic separation cleaning is picked from a magnetic separation plate operation station 911 or 921 by the second cup gripper 7 and placed into the first rear operation station 413 at the outer circle portion of the reaction plate, the reaction plate 4 rotates clockwise to take the reaction cup to the first front operation station 411, the reaction cup is picked from the first front operation station 411 at the outer circle portion of the reaction plate by the first cup gripper 2 and placed into the temporary storage station 121 of the temporary storage plate 12, and the temporary storage plate 12 rotates.

A next cycle as followed: the reaction cup is picked from the temporary storage station 122 by the first cup gripper 2 and placed into the first front operation station 411 at the outer circle portion of the reaction plate, the reaction plate rotates to take the reaction plate to be added with a reagent to the reagent addition station 412, and a reagent is added by the reagent pin; and the reaction plate rotates 14 cup stations counterclockwise to the first rear operation station 413, and the reaction cup is grabbed to the available mixing mechanism 81 or 82 by the second cup gripper 7.

A further next cycle: the mixing mechanism performs mixing;

A further next cycle: in this cycle or at the end of the last cycle, the reaction cup after mixing is grabbed back to the second rear operation station 42 at the inner circle portion of the reaction plate by the second cup gripper 7 and is then incubated; the reaction cup is incubated at the inner circle portion of the reaction plate for a predetermined time according to the needed incubation time;

after incubation of the reaction cup in the reaction plate, the reaction cup is scheduled to the second rear operation station 42 (e.g., the second rotation stopping action of the reaction plate 4) by the reaction plate 4, and the reaction cup is grabbed out by the second cup gripper 7 and placed into the available magnetic separation unit 91 or 92 to perform magnetic separation cleaning; and a substrate is injected after magnetic separation cleaning, and the reaction cup is scheduled to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed;

the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

It should be noted that the cycle is of a fixed duration, but how to define the start and end points of each cycle can be determined according to the actual situation, e.g., if one cycle is 2 seconds, the first and second seconds can be defined as a cycle, or the second and third seconds can also be defined as a cycle, so that the operations performed in the corresponding cycle are slightly different. The examples described above illustrate the actions performed by some mechanisms and units in each cycle, which is only a way to define the cycle. Those skilled in the art would have understood that as long as the duration of the cycle is constant, how to define the start point of the cycle and all the changes in the actions performed by the mechanisms and units in each cycle fall within the concept of the present disclosure.

In addition, in a biochemical or immunological analysis apparatus, since the sample pin, the reagent pin, the magnetic separation solution-aspiration pin, the solution-injection pin or other probe pin is in contact with samples, reagents and other substances, its surface and inner wall will be deposited with some foreign substances, so it needs to be cleaned regularly (for example, before starting the test project every day) with a special cleaning solution to ensure its surface properties and solution absorption performance. For example, in many cases, a cleaning solution containing sodium hypochlorite as a main component is used, which has disinfection, sterilization, bleaching and decontamination functions. When the effective chlorine concentration of the sodium hypochlorite solution is about 0.5% to 1%, the cleaning effect is the best, but at this time, its stability is poor, and it is difficult to store and transport for a long time. Only when the sodium hypochlorite solution has a higher concentration, its stability is relatively high. Therefore, the currently produced sodium hypochlorite solutions are relatively high in concentration and need to be used after dilution.

The use of sodium hypochlorite solution on the analysis apparatus makes use of its sterilization and decontamination effects. In the currently used solutions, the customer manually dilutes the concentrated solution to the concentration required for the probe pin cleaning in the analysis apparatus according to the requirements of the analysis apparatus manufacturer. In order to ensure the accuracy and convenience of the customer's dilution, a container with a scale is generally provided. The volume of the container is designed such that, with the amount of diluent that ensures the use by the customer for one week as a design indicator, the customer is required to add the concentrated solution to the scale, then fill a barrel with deionized water or tap water, then shake the barrel to mix, and use the solution after standing for a while to ensure full dilution. When in use, the diluted cleaning solution can be dispensed into sample tubes or reagent bottles daily, and the sample tubes are loaded in a sample rack and scheduled to the probe pin for aspiration, or the reagent bottles are loaded into a reagent plate and scheduled to the probe pin for aspiration. Or else a vat of diluted solution is directly loaded into the machine, and the diluted solution is scheduled to the probe pin for cleaning by means of a complicated designed pipeline system. It can be seen that the current solution has the following problems: 1) inconvenient operation due to manual dilution; 2) inconvenient storage of the diluted solution so that it can be diluted up to the amount for use for one week at a time; 3) many steps for manual operation after dilution; and 4) the complicated fluid system for the solution of automatic loading after dilution. For the above problems, the automatic analysis apparatus is provided with two cleaning solution placement stations, one of which is used to hold a container filled with a concentrated cleaning solution, and the other one is used to hold a container filled with a diluent that is used to dilute the concentrated cleaning solution, and then by means of the dispensing mechanism, e.g., the sample pin and/or the reagent pin, the solutions are quantitatively aspirated and discharged into the same reaction cup so as to complete the preparation of the diluted cleaning solution, which will be described in detail below.

Figure 7:
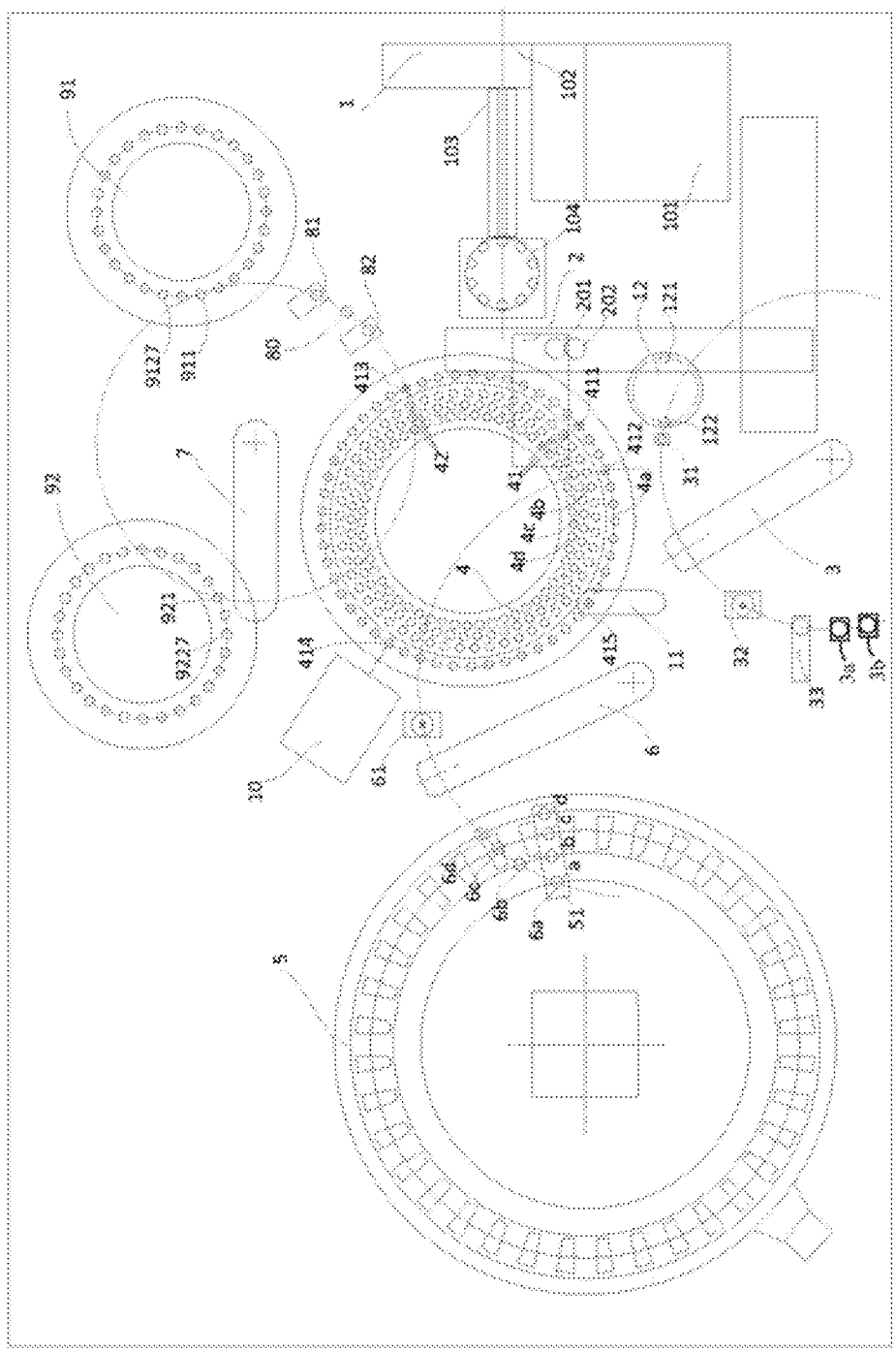
FIG. 7 is a structural schematic diagram of an automatic analysis apparatus of still another embodiment.

Referring to FIG. 7, in one embodiment, the automatic analysis apparatus may comprise a dispensing mechanism, a reaction plate 4, a transfer mechanism, a control unit (not depicted in the figure) and two cleaning solution placement stations.

The dispensing mechanism is used for solution aspiration and solution discharge. The reaction plate 4 is configured to be of a circular plate structure, the reaction plate 4 is provided with a plurality of placement stations for placement of reaction cups, the reaction plate 4 can rotate and drive rotation of the reaction cups inside the placement stations so as to schedule the reaction cups in the reaction plate and incubate a reaction solution in the reaction cup.

The transfer mechanism is used to schedule a reaction cup into the reaction plate 4 or out of the reaction plate 4.

In the above two cleaning solution placement stations, one of them is used to hold a container filled with a concentrated cleaning solution, and the other one is used to hold a container filled with a diluent that is used to dilute the concentrated cleaning solution. The two cleaning solution placement stations are arranged on a trajectory of motion of the dispensing mechanism.

The control unit is used to control the dispensing mechanism to respectively aspirate a solution in each of the containers at the two cleaning solution placement stations and discharge the same into the reaction cup to prepare a diluted cleaning solution. In one embodiment, the dispensing mechanism is controlled by the control unit to respectively quantitatively aspirate the solution in each of the containers at the two cleaning solution placement stations and discharge the same into the reaction cup to prepare a diluted cleaning solution.

In one embodiment, the dispensing mechanism comprises a sample dispensing mechanism 3 used to aspirate a sample and discharge the same to a reaction cup at a sample addition station, and a reagent dispensing mechanism 6 used to aspirate a reagent and discharge the same to a reaction cup at a reagent addition station. In one embodiment, both the above cleaning solution placement stations are arranged on a trajectory of motion of the sample dispensing mechanism. In one embodiment, both the above cleaning solution placement stations are arranged on a trajectory of motion of the reagent dispensing mechanism. In one embodiment, in the above two cleaning solution placement stations, one of which is arranged on the trajectory of motion of the sample dispensing mechanism, and the other one is arranged on the trajectory of motion of the reagent dispensing mechanism. FIG. 7 shows one of the solutions, i.e., both the above two cleaning solution placement stations 3a, 3b are arranged on the trajectory of motion of the sample dispensing mechanism.

If the above two cleaning solution placement stations are both arranged on the trajectory of motion of the sample dispensing mechanism 3, the transfer mechanism and/or the reaction plate 4 coordinate to schedule the reaction cup to the sample addition station, and the control unit controls the sample dispensing mechanism 3 to aspirate the concentrated cleaning solution and discharge the same into the reaction cup at the sample addition station, and controls the sample dispensing mechanism to aspirate the diluent and discharge the same into the reaction cup at the sample addition station. The sample addition station may be arranged outside the reaction plate 4 or may be arranged inside the reaction plate 4.

If both the cleaning solution placement stations are arranged on the trajectory of motion of the reagent dispensing mechanism 6, the transfer mechanism and/or the reaction plate 4 coordinate to schedule the reaction cup to the reagent addition station, and the control unit controls the reagent dispensing mechanism 6 to aspirate the concentrated cleaning solution and discharge the same into the reaction cup at the reagent addition station, and controls the reagent dispensing mechanism 6 to aspirate the diluent and discharge the same into the reaction cup at the reagent addition station. The reagent addition station may be arranged outside the reaction plate 4 or may be arranged inside the reaction plate 4.

If one of the above two cleaning solution placement stations is arranged on the trajectory of motion of the sample dispensing mechanism 3, and the other cleaning solution placement station is arranged on the trajectory of motion of the reagent dispensing mechanism 6, the transfer mechanism and/or the reaction plate coordinate to respectively schedule the reaction cup to the sample addition station and the reagent addition station, when the reaction cup is located at the sample addition station, the control unit controls the sample dispensing mechanism 3 to aspirate the solution at the cleaning solution placement station passed thereby and discharge the same into the reaction cup at the sample addition station, and when the reaction cup is located at the reagent addition station, the control unit controls the reagent dispensing mechanism 6 to aspirate the solution at the cleaning solution placement station passed thereby and discharge the same into the reaction cup at the reagent addition station.

It should be noted that the above sequence of aspiration of a concentrated cleaning solution and the aspiration of a diluent is not fixed. The concentrated cleaning solution may be firstly aspirated, or the diluent may be firstly aspirated. If the aspiration of the concentrated cleaning solution and the aspiration of the diluent are respectively performed by one of the sample dispensing mechanism 3 and the reagent dispensing mechanism 6, the two mechanisms even operate in parallel, in which one of the mechanisms aspirates the concentrated cleaning solution, while the other one aspirates the diluent.

In one embodiment, the automatic analysis apparatus further comprises a mixing mechanism used to mix the reaction solution in the reaction cup; and the transfer mechanism and/or the reaction plate coordinate to schedule the reaction cup filled with the diluted cleaning solution to the mixing mechanism to perform mixing. The diluted cleaning solution after mixing can be used for cleaning.

In one embodiment, the automatic analysis apparatus further comprises a magnetic separation unit used to perform magnetic separation cleaning on the reaction solution in the reaction cup. The transfer mechanism and/or the reaction plate 4 coordinate to schedule the reaction cup filled with the diluted cleaning solution to the magnetic separation unit to clean a magnetic separation solution-injection pin and a magnetic separation solution-aspiration pin in the magnetic separation unit.

In the specific cleaning process, the diluted cleaning solution can be scheduled to the sample addition station to perform cleaning on a sample pin in the sample dispensing mechanism, and the diluted cleaning solution is scheduled to the reagent addition station to perform cleaning on a reagent pin in the reagent dispensing mechanism.

In one embodiment, the remaining amounts of the concentrated cleaning solution and the diluent at the two cleaning solution placement stations can be detected by means of detection on the solution level of the sample pin or the reagent pin. The percentage of the remaining amount is displayed on a software consumables interface, in which when the solution level is greater than or equal to the height of the bottle mouth, the remaining amount is 100%, when the solution level is less than or equal to the height corresponding to the dead volume set at the bottom of the bottle, the remaining amount is 0%, and the intermediate heights are calculated in percentage. When the remaining amount is less than the set remaining amount, such as 5%, the control unit is driven to give a reminder, asking the user to add the corresponding solution, and when the remaining amount is equal to 0%, the automatic dilution function is stopped, and the control unit gives an alarm.

The user only needs to load the concentrated cleaning solution and the diluent to the analyzer's designated position, and the apparatus will automatically prepare the diluted cleaning solution of the required concentration before cleaning the probe pin as required, and show the remaining amount in real time during use to remind the user to replace the corresponding solution according to the preset conditions. By means of the simple scheduling of the existing functional modules of the apparatus, it solves the problem of the convenience of operation of other solutions, and does not need to independently design a dilution solution path system responsible for preparing a diluted cleaning agent, which simplifies the design solution, makes full use of the functions of the existing analysis apparatus and reduces the cost of whole machine. It has certain practical value and economic value.

Those skilled in the art would have understood that all or some of the functions of the various methods in the above embodiments may be implemented by means of hardware or by means of a computer program. When all or some of the functions in the above embodiments are implemented by means of a computer program, the program may be stored in a computer-readable storage medium, and the storage medium may include: a read-only memory, a random access memory, a magnetic disk, an optical disk, a hard disk, etc., and the program is executed by a computer to achieve the above functions. For example, the program is stored in a memory of the device, and when the program in the memory is executed by the processor, all or some of the above functions can be implemented. In addition, when all or some of the functions in the above embodiments are implemented by means of a computer program, the program may also be stored in a storage medium such as a server, another computer, a magnetic disk, an optical disk, a flash disk or a mobile hard disk, may be saved to memory of the local device by downloading or copying, or may perform version updating on the system of the local device. When the program in the memory is executed by the processor, all or some of the functions in the above embodiments can be implemented.

The present disclosure has been described with reference to specific examples, which are merely for the purpose of facilitating understanding of the present disclosure and are not intended to limit the present disclosure. It will be apparent to those skilled in the art that changes may be made to the specific embodiments described above in accordance with the teachings of the present disclosure.

What is claimed is:

1. An automatic analysis apparatus, comprising:
   a reaction cup loading mechanism configured to supply and carry a reaction cup to a cup assignment station;
   a sample unit configured to hold a sample;
   a sample dispensing mechanism configured to aspirate the sample and discharge the sample into a reaction cup at a sample addition station;
   a reagent unit configured to hold a reagent;

a reagent dispensing mechanism configured to aspirate the reagent and discharge the reagent into a reaction cup at a reagent addition station;

a reaction plate, which is configured to be of a circular plate structure, which comprises a plurality of placement stations for placement of reaction cups, and which is capable of rotating and driving a rotation of the reaction cups in the placement stations so as to transfer the reaction cups in the reaction plate and incubate a reaction solution in the reaction cup;

a mixing mechanism configured to mix the reaction solution to be mixed in the reaction cup;

a measurement unit configured to measure the reaction solution to be measured;

a magnetic separation unit configured to perform magnetic separation cleaning on the reaction solution in the reaction cup;

a transfer mechanism configured to at least transfer a reaction cup among the reaction cup loading mechanism, the reaction plate, the mixing mechanism and the magnetic separation unit;

a control unit configured to at least control operations and a time sequence of the sample dispensing mechanism, the reagent unit, the reagent dispensing mechanism, the reaction plate, the mixing mechanism, the measurement unit, the magnetic separation unit and the transfer mechanism; and a temporary storage portion, which is arranged independent from the reaction plate and is configured to receive and temporarily store the reaction cup that is transferred from the reaction plate by the transfer mechanism so as to wait to be transferred back to the reaction plate again;

wherein when a number of reagents to be added to the reaction cup for one incubation is a first number, the control unit is further configured to, after controlling the reagent dispensing mechanism to add a preset number of reagents to the reaction cup, control the transfer mechanism to transfer the reaction cup to the temporary storage portion to perform temporary storage, and then control the transfer mechanism to transfer the reaction cup from the temporary storage portion back to the reaction plate to continue adding other reagents needed for the one incubation, the preset number being less than the first number; and when the number of reagents to be added to the reaction cup for one incubation is a second number, the control unit is further configured to control the reagent dispensing mechanism to add the second number of reagents to the reaction cup without transferring the reaction cup to the temporary storage portion, the second number being less than or equal to the preset number.

2. The automatic analysis apparatus of claim 1, wherein the reaction plate comprises the reagent addition station; and the reagent dispensing mechanism is configured to discharge the preset number of reagents at most into the reaction cup at the reagent addition station each time.

3. The automatic analysis apparatus of claim 1, wherein when a test project for any reaction cup is a multi-step test project, in any step of test other than a last step of test, when the reaction cup needs to be performed magnetic separation cleaning in this step of test, the reaction cup after incubation in the reaction plate is firstly transferred to the magnetic separation unit by the transfer mechanism to perform magnetic separation cleaning, and then the reaction cup after magnetic separation cleaning is transferred from the magnetic separation unit to the temporary storage portion to perform temporary storage; when the reaction cup in this step of test does not need to be performed magnetic separation cleaning, the reaction cup after incubation in the reaction plate is transferred from the reaction plate to the temporary storage station by the transfer mechanism to perform temporary storage; and the reaction cup temporarily stored in the temporary storage portion is then transferred back to the reaction plate to complete subsequent steps of test.

4. The automatic analysis apparatus of claim 3, wherein the magnetic separation unit is arranged outside the reaction plate in a separated manner; and the reaction cup after magnetic separation cleaning is transferred from the magnetic separation unit to the temporary storage portion by the transfer mechanism to perform temporary storage, wherein the reaction cup is firstly transferred from the magnetic separation unit to the reaction plate, and the reaction cup is then transferred from the reaction plate to the temporary storage portion.

5. The automatic analysis apparatus of claim 1, wherein the sample addition station is arranged outside the reaction plate; and after a diluent or a pretreatment solution is added to the reaction cup at the reagent addition station by the reagent dispensing mechanism, the reaction cup is transferred from the reaction plate to the temporary storage portion by the transfer mechanism to perform temporary storage, the diluted or pretreated sample is aspirated from the reaction cup by the sample dispensing mechanism and discharged into a reaction cup at the sample addition station at this time, and the transfer mechanism then performs a cup discarding operation on the reaction cup at the temporary storage portion.

6. The automatic analysis apparatus of claim 5, wherein the temporary storage portion at least comprises a first temporary storage station and a second temporary storage station, the temporary storage portion comprises a rotatable circular plate configured to transfer a reaction cup between the first temporary storage station and the second temporary storage station.

7. The automatic analysis apparatus of claim 1, wherein the temporary storage portion is arranged outside the reaction plate in a separated manner.

8. The automatic analysis apparatus of claim 6, wherein the first temporary storage station of the temporary storage portion is configured to receive a reaction cup that is transferred from the reaction plate by the transfer mechanism, and the reaction cup is then transferred to the second temporary storage station by the temporary storage portion, so that the unoccupied first temporary storage station is further capable of receiving a reaction cup that is transferred from the reaction plate by the transfer mechanism; and when the reaction cup transferred to the second temporary storage station further needs to perform a subsequent test, the reaction cup at the second temporary storage station is transferred back to the reaction plate by the transfer mechanism; when the reaction cup transferred to the second temporary storage station is the reaction cup to which the diluent or pretreatment solution is added by the reagent dispensing mechanism when the reaction cup is previously at the reagent addition station, the diluted or pretreated sample is aspirated from the reaction cup by the sample dispensing mechanism and is discharged into the reaction cup at the sample addition station at this time, and the transfer mechanism then performs the cup discarding operation on the reaction cup at the second temporary storage station; or, after a preset period of time, the reaction cup is then transferred from the second temporary storage station back to the first temporary storage station by the temporary storage portion, when the reaction cup needs to perform a subsequent test, the reaction cup is transferred back to the reaction plate by the transfer mechanism, and when a sample is aspirated from the reaction cup at the second temporary storage station, the transfer mechanism performs the cup discarding operation on the reaction cup at the first temporary storage station at this time.

9. The automatic analysis apparatus of claim 1, wherein the reaction plate comprises an inner circle portion and an outer circle portion which are capable of rotating independently or together; the inner circle portion comprises one or more circles of tracks, each of which is provided with a plurality of placement stations at least for incubation on the reaction cups; the outer circle portion comprises one or more circles of tracks, each of which is provided with the plurality of placement stations; the reaction plate is configured to transfer a reaction cup between the placement stations at the inner circle portion and transfer a reaction cup between the placement stations at the outer circle portion; wherein the reaction plate comprises the reagent addition station, a first front operation station and a first rear operation station which are located at the outer circle portion, and has a second front operation station and a second rear operation station which are located at the inner circle portion; wherein the first front operation station is used for the transfer mechanism to transfer outside the reaction cup that needs to be transferred from the outer circle portion to the temporary storage portion, or is configured to receive the reaction cup that is transferred from the temporary storage portion to the reaction plate by the transfer mechanism; the sample addition station is a placement station in the reaction plate, or the sample addition station is arranged outside the reaction plate; when the sample addition station is arranged outside the reaction plate, the first front operation station is further configured to receive the reaction cup that is transferred from the sample addition station to the reaction plate by the transfer mechanism; the first rear operation station is used for the transfer mechanism to transfer the reaction cup to the mixing mechanism, or is configured to receive the reaction cup that is transferred from the magnetic separation unit to the reaction plate by the transfer mechanism; the second front operation station is used for the transfer mechanism to transfer outside the reaction cup that needs to be transferred from the inner circle portion to the temporary storage portion; and the second rear operation station is used for the transfer mechanism to transfer the reaction cup to the magnetic separation unit.

10. The automatic analysis apparatus of claim 9, wherein the transfer mechanism comprises a first cup gripper and a second cup gripper; the first cup gripper is configured such that a trajectory of motion thereof passes the cup assignment station, the temporary storage portion, the first front operation station and the second front operation station, and when the sample addition station is arranged outside the reaction plate, the trajectory of motion of the first cup gripper also passes the sample addition station; and the second cup gripper is configured such that a trajectory of motion thereof passes the first rear operation station, the second rear operation station, the mixing mechanism and the magnetic separation unit.

11. The automatic analysis apparatus of claim 10, wherein when the sample addition station is arranged outside the reaction plate, the first cup gripper is configured to transfer a reaction cup from the cup assignment station to the sample addition station and transfer the reaction cup from the sample addition station to the first front operation station;

the first cup gripper is further configured to transfer a reaction cup between the first front operation station and the temporary storage portion and transfer the reaction cup from the second front operation station to the temporary storage portion; and the second cup gripper is configured to transfer a reaction cup from the first rear operation station to the mixing mechanism, from the mixing mechanism to the second rear operation station, from the second rear operation station to the magnetic separation unit, and from the magnetic separation unit to the first rear operation station.

12. The automatic analysis apparatus of claim 9, further comprising a transitional temporary storage portion, wherein the first front operation station is further used for the transfer mechanism to discard the reaction cup that has been measured by the measurement unit; when the control unit detects that the reaction cup that has been measured is not discarded at the first front operation station by the transfer mechanism, the transfer mechanism is controlled by the control unit to stop scheduling the reaction cup from the temporary storage portion or the sample addition station to the first front operation station; when the reaction cup that has been measured but has not been discarded at the first front operation station is transferred to the first rear operation station by the reaction plate, and when a reaction cup after magnetic separation cleaning by the magnetic separation unit needs to be transferred to the reaction plate at this time, the reaction cup after cleaning by the magnetic separation unit is firstly transferred to the transitional temporary storage portion by the transfer mechanism, and the reaction cup at the transitional temporary storage portion is then transferred to the first rear operation station by the transfer mechanism when the control unit detects that the first rear operation station is unoccupied.

13. The automatic analysis apparatus of claim 8, further comprising a transitional discarding portion, wherein the first front operation station is further used for the transfer mechanism to discard the reaction cup that has been measured by the measurement unit; when the control unit detects that the reaction cup that has been measured is not discarded at the first front operation station by the transfer mechanism, the transfer mechanism is controlled by the control unit to stop scheduling the reaction cup from the temporary storage portion or the sample addition station to the first front operation station; and when the reaction cup that has been measured but has not been discarded at the first front operation station is transferred to the first rear operation station by the reaction plate, the reaction cup is transferred to the transitional discarding portion by the transfer mechanism to perform discarding.

14. The automatic analysis apparatus of claim 1, wherein the magnetic separation unit comprises a magnetic separation plate of a circular plate structure, the magnetic separation plate is provided with one or more circles of tracks for independent or simultaneous movement, each of the tracks comprises a plurality of placement stations for placement of reaction cups, the magnetic separation plate is capable of rotating and driving a rotation of the reaction cups in the placement stations and is configured to transfer a reaction cup inside the magnetic separation plate to a solution addition station and a solution aspiration station to perform magnetic separation cleaning, and the magnetic separation unit is arranged outside the reaction plate in a separated manner.

15. The automatic analysis apparatus of claim 1, wherein the magnetic separation unit is arranged in a separated manner; or, the magnetic separation-unit is arranged in a coaxial and independently driven manner.

16. The automatic analysis apparatus of claim 1, further comprising: two cleaning solution placement stations, one of which is configured to hold a container filled with a concentrated cleaning solution, and the other of which is configured to hold a container filled with a diluent that is configured to dilute the concentrated cleaning solution; and both the cleaning solution placement stations are arranged on a trajectory of motion of the sample dispensing mechanism or arranged on a trajectory of motion of the reagent dispensing mechanism; or, one of the two cleaning solution placement stations is arranged on the trajectory of motion of the sample dispensing mechanism, and the other of the two cleaning solution placement stations is arranged on the trajectory of motion of the reagent dispensing mechanism.

17. An operating method for an automatic analysis apparatus, comprising:
scheduling a reaction cup firstly to a sample addition station to perform sample addition;
scheduling the reaction cup after sample addition to a reagent addition station in a reaction plate to perform reagent addition;
scheduling the reaction cup after reagent addition to a mixing mechanism;
scheduling the reaction cup from the mixing mechanism to a position for incubation in the reaction plate to perform incubation;
scheduling the reaction cup after incubation to a magnetic separation mechanism to perform magnetic separation cleaning; and
scheduling the reaction cup after magnetic separation cleaning back to the reaction plate by which the reaction cup is transferred in the reaction plate to an optical measurement station to perform optical measurement;
wherein:
a preset number of reagents is added at most into the reaction cup at the reagent addition station in the reaction plate each time; wherein
when a number of reagents to be added to the reaction cup at the reagent addition station for one incubation is a first number which is greater than the preset number, after adding the preset number of reagents to the reaction cup, scheduling the reaction cup to a temporary storage area independent from the reaction plate to perform temporary storage; and then scheduling the reaction cup from the temporary storage area back to the reaction plate to continue adding other reagents needed for the one incubation; and when the number of reagents to be added to the reaction cup at the reagent addition station for one incubation is a second number which is less than or equal to the preset number, adding the second number of reagents to the reaction cup without scheduling the reaction cup to the temporary storage area.

18. The operating method of claim 17, wherein the step, in which when the number of reagents to be added to the reaction cup at the reagent addition station for one incubation is a first number which is greater than the preset number, after the reaction cup is added with the preset number of reagents, scheduling the reaction cup to the temporary storage area independent from the reaction plate to perform temporary storage, comprises:
after the preset number of reagents is added to the reaction cup, scheduling the reaction cup from the reaction plate to the mixing mechanism;
scheduling the reaction cup from the mixing mechanism to the position for incubation in the reaction plate;
scheduling the reaction cup from the position for incubation in the reaction plate to the temporary storage area; and
scheduling the reaction cup from the temporary storage area back to the reaction plate to continue adding other reagents needed for this incubation.

19. The operating method of claim 17, further comprising: after a diluent or a pretreatment solution is added to the reaction cup at the reagent addition station, scheduling the reaction cup to the temporary storage area, aspirating the diluted or pretreated sample from the reaction cup and discharging the diluted or pretreated sample to a reaction cup at the sample addition station at this time, then performing cup discarding treatment on the reaction cup in the temporary storage area, and scheduling the reaction cup at the sample addition station to the reaction plate to perform a subsequent test.

20. The operating method of claim 19, wherein the temporary storage area at least comprises a first temporary storage station and a second temporary storage station, scheduling, by a rotatable circular plate, the reaction cup between the first temporary storage station and the second temporary storage station; the first temporary storage station is configured to receive a reaction cup that is transferred from the reaction plate, and after the reaction cup is transferred from the reaction plate to the first temporary storage station, scheduling the reaction cup to the second temporary storage station; when the reaction cup that is transferred to the second temporary storage station further needs a subsequent test, scheduling the reaction cup at the second temporary storage station back to the reaction plate; and when the reaction cup that is transferred to the second temporary storage station is the reaction cup to which the diluent or pretreatment solution is added when the reaction cup is previously at the reagent addition station, aspirating the diluted or pretreated sample from the reaction cup and discharging the diluted or pretreated sample into the reaction cup at the sample addition station at this time, and then performing a cup discarding operation on the reaction cup at the second temporary storage station.

21. The operating method of claim 17, wherein the automatic analysis apparatus comprises at least two magnetic separation units, each of which operates independently and is configured to perform magnetic separation cleaning on the reaction solution in the reaction cup, the operating method further comprising: after a test is started, controlling the magnetic separation units to receive the reaction cup in respective corresponding cycles, wherein when N magnetic separation units are provided, a reaction cup receiving cycle corresponding to an ith magnetic separation unit is an (kN+i)th cycle, N being an integer greater than or equal to 2, k being an integer greater than or equal to 0, and the value of i being in a range of 1 to N.

22. The operating method of claim 21, wherein two magnetic separation units are provided, controlling the two magnetic separation units to receive the reaction cup in the respective corresponding cycles, wherein a reaction cup receiving cycle corresponding to one of the two magnetic separation units is an odd-numbered cycle, and a reaction cup receiving cycle corresponding to the other of the two magnetic separation units is an even-numbered cycle.

23. The operating method of claim 18, wherein the step, in which the reaction cup is transferred from the temporary storage area back to the reaction plate, comprises: in a next cycle, scheduling the reaction cup from the temporary storage area back to the reaction plate.

* * * * *